United States Patent [19]
Lwee

[11] Patent Number: 5,299,089
[45] Date of Patent: Mar. 29, 1994

[54] CONNECTOR DEVICE HAVING TWO STORAGE DECKS AND THREE CONTACT ARRAYS FOR ONE HARD DISK DRIVE PACKAGE OR TWO MEMORY CARDS

[75] Inventor: Nai Hock Lwee, Fremont, Calif.

[73] Assignee: E. I. DuPont de Nemours & Co., Wilmington, Del.

[21] Appl. No.: 967,589

[22] Filed: Oct. 27, 1992

[30] Foreign Application Priority Data

Oct. 28, 1991 [JP] Japan .................................. 3-281653
Dec. 24, 1991 [JP] Japan .............................. 3-106403[U]

[51] Int. Cl.⁵ ...................... H05K 7/10; H01R 13/62; G06F 1/16
[52] U.S. Cl. ................................... 361/684; 361/754; 361/798; 361/685; 439/159; 439/172; 439/540
[58] Field of Search ............... 439/64, 152, 153, 155, 439/157, 159, 160, 172, 540; 235/440, 441, 475, 480, 483, 485; 364/708, 708.1; 361/679-686, 724-727, 729-733, 754, 785, 790, 798; 360/137; 369/754

[56] References Cited

U.S. PATENT DOCUMENTS

| | | | |
|---|---|---|---|
| 4,918,572 | 4/1990 | Tarver | 361/683 X |
| 4,952,161 | 8/1990 | Komatsu | 439/155 |
| 5,033,972 | 7/1991 | Komatsu | 439/153 |
| 5,149,276 | 9/1992 | Dixon | 439/159 |
| 5,152,697 | 10/1992 | Abe | 439/152 |
| 5,176,523 | 1/1993 | Lai | 439/64 |
| 5,197,894 | 3/1993 | Koike | 439/159 |

*Primary Examiner*—Leo P. Picard
*Assistant Examiner*—Michael W. Phillips
*Attorney, Agent, or Firm*—Woodcock, Washburn Kurtz, Mackiewicz & Norris

[57] ABSTRACT

A connector device comprises a housing and a connector body coupled to one end of the housing. One hard disk drive package is inserted in the inner space of the housing which is constituted by first and second decks. When the hard disc drive package is not inserted in the inner space of the housing, two memory cards are inserted in the first and second decks, respectively.

25 Claims, 17 Drawing Sheets

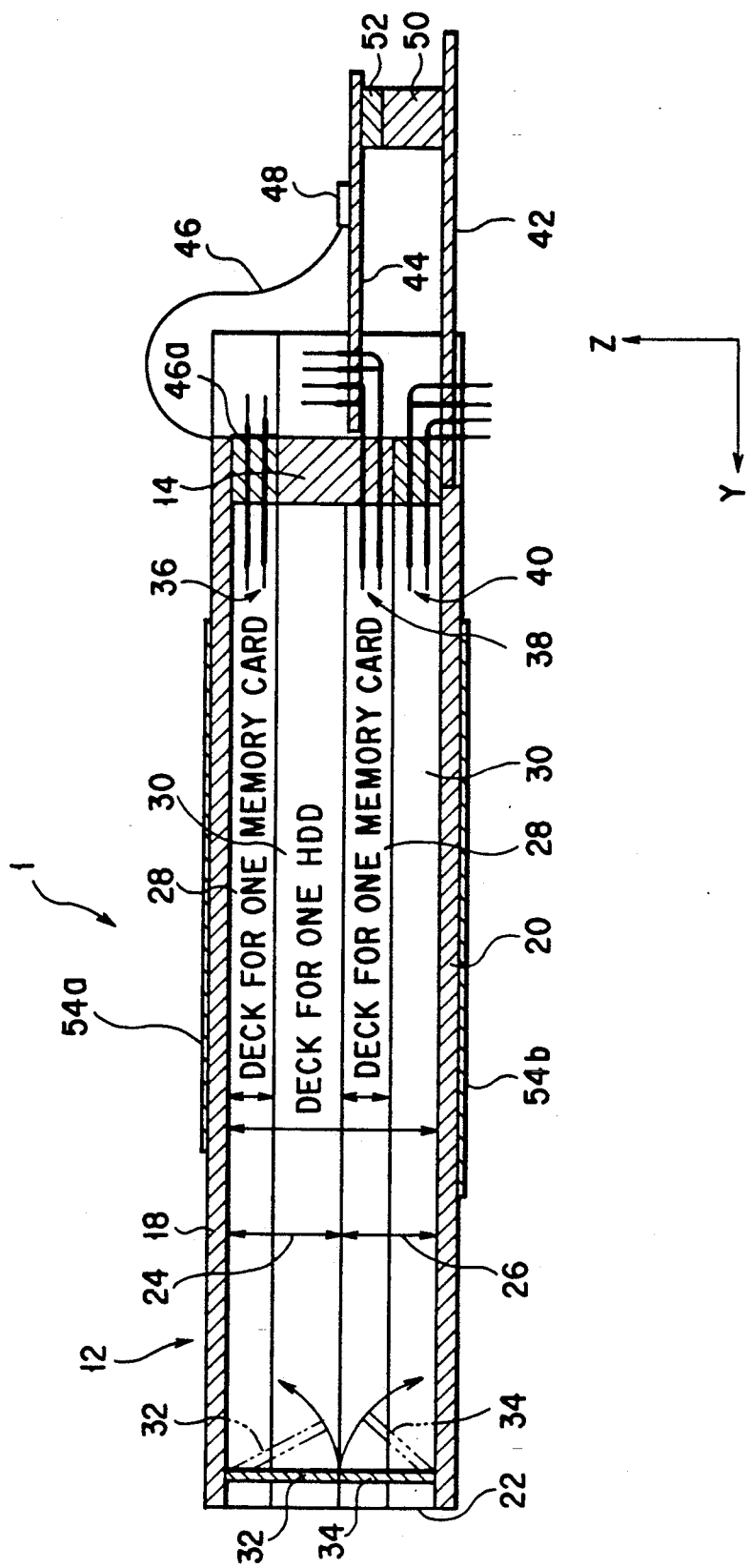
F I G. 2

CONNECTOR DEVICE HAVING TWO STORAGE DECKS AND THREE CONTACT ARRAYS FOR ONE HARD DISK DRIVE PACKAGE OR TWO MEMORY CARDS

BACKGROUND OF THE INVENTION

1. Field of the Invention

This invention relates to connector devices and, more particularly, to connector devices capable of using for both a memory card and a hard disk drive package serving as a data storage medium to be connected to a personal computer, a laptop computer, or a Notebook-PC etc.

2. Description of the Related Art

The recent development in personal computers has created what has become known as the laptop computer which is substantially portable and consumes little power. A further advancement on the laptop computer is the so-called Notebook-PC.

As the size reduction of the computer device such as the personal computer, the laptop computer, or the Notebook-PC is promoted, demand has arisen for increasing its data storage capacity at low cost. To increase the processing speed of stored data and to increase the capacity, it is preferable to use a memory card or a hard disk as data storage medium rather than a floppy disk.

The memory card is advantageous a it is detachably mounted in a computer device and is portable.

Although a low-profile, portable hard disk drive package incorporating a hard disk drive (HDD) is available, it is comparatively expensive. Accordingly, when an HDD package is integrally assembled in each individual computer device, the cost of the computer device is increased.

Furthermore, if the computer device incorporates the HDD package, even a malicious third party can start the operating system (OS). Therefore, data stored in the hard disk can be illegally used or misused.

For these reasons, it is demanded that an HDD package is detachably connected to a computer device in the same manner as a memory card, so that the single HDD package can be compatibly used with a plurality of computer devices, and separated from the computer device and stored or carried. Since the specifications of hard disks differ from each other depending on operating systems, it is preferable that the HDD package be detachably connected to the computer device so as to allow an end user a wide choice of the operating systems.

SUMMARY OF THE INVENTION

It is an object of the present invention to provide a connector device which can be commonly employed for two kinds of data storage media and which allows both of them to be detachably mounted, thereby satisfying the demands described above.

According to the present invention, there is provided a connector device for selectively connecting at least one of a first and second data storage medium, comprising:

a housing defined by a pair of opposing side walls and having an insertion port located at one end in a length of the housing, a plurality of divided spaces which are divided in a height of the housing so that the one data storage medium which is selectively inserted through the insertion port is received therein, and guide members, respectively formed on the side walls in correspondence with the respective divided spaces, for guiding the respective data storage media from the insertion port into the housing, the plurality of divided spaces including at least one first divided space for receiving the one first data storage medium therein and at least one second divided space for receiving the one second data storage medium therein; and a connector body coupled to the other end of the housing in the length of the housing, the connector body including at least one first connector and at least one second connector, the first connector being formed in correspondence with the first divided space to establishing a mechanical and electrical connection to the one first data storage medium received in a corresponding the one first divided space, and the second connector being formed in correspondence with the second divided space to establishing mechanical and electrical connection to the one second data storage medium received in a corresponding the one second divided space.

According to the present invention, there is provided another connector device for selectively connecting at least one of a memory card and a hard disk drive package as a data storage medium, comprising:

a housing defined by a pair of opposing side walls and having an insertion port located at one end in a length of the housing, a plurality of divided spaces which are divided in a height of the housing so that the data storage medium which is selectively inserted through the insertion port is received therein, and guide members, respectively formed on the side walls in correspondence with the respective divided spaces, for guiding the respective data storage medium from the insertion port into the housing, the plurality of divided spaces including at least two first divided space each for receiving the one first data storage medium therein and at least one second divided space for receiving one second data storage medium package therein; and a connector body coupled to the other end of the housing in the length of the housing the connector body including at least two first connectors and at least one second connector, the first connector being formed in correspondence with each of the first divided space to establishing a mechanical and electrical connection to the first data storage medium received in a corresponding one of the first divided space, and the second connector being formed in correspondence with the second divided space to establishing mechanical and electrical connection to the one second data storage medium received in a corresponding one second divided spaces; and first and second circuit boards, the first circuit board being directly and electrically connected to one of the first connectors, and being indirectly and electrically connected to the other first connector, and the second circuit board being directly and electrically connected to the second connector.

According to the connector device of the present invention, since the housing has the first divided space for a first data storage medium and the second divided space for a second data storage medium, a memory card and an HDD package can be selectively used as a data storage medium.

According to this connector device, since one connector device can be commonly used for both a memory card and an HDD package, the HDD package can be detachably loaded in an electronic device such as a computer system in the same manner as the memory card. Therefore, the HDD package need not be integrally incorporated in the computer system or the like, thus realizing a cost reduction and improving flexibility in selection of OSs by end users. In addition, since the HDD package can be stored after it is separated from the computer system, data stored in the hard disk drive can be secured.

Furthermore, since the connectors of the connector device are separately arranged for a memory card and an HDD package, design of a circuit to be connected to the connector device is facilitated.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 2 is a sectional view taken along the line II—II of FIG. 1;

DETAILED DESCRIPTION OF THE PREFERRED EMBODIMENTS

FIGS. 1 to 9 show the first embodiment of the present invention. Referring to each drawing, the widthwise direction, the direction of the length, and the direction of the height of a connector device and a data storage medium are defined as X, Y, and Z directions, respectively.

A connector device 1 of this embodiment can selectively receive one or two pieces of memory card or one hard disc drive (HDD) package as a data storage medium.

Figure 1:
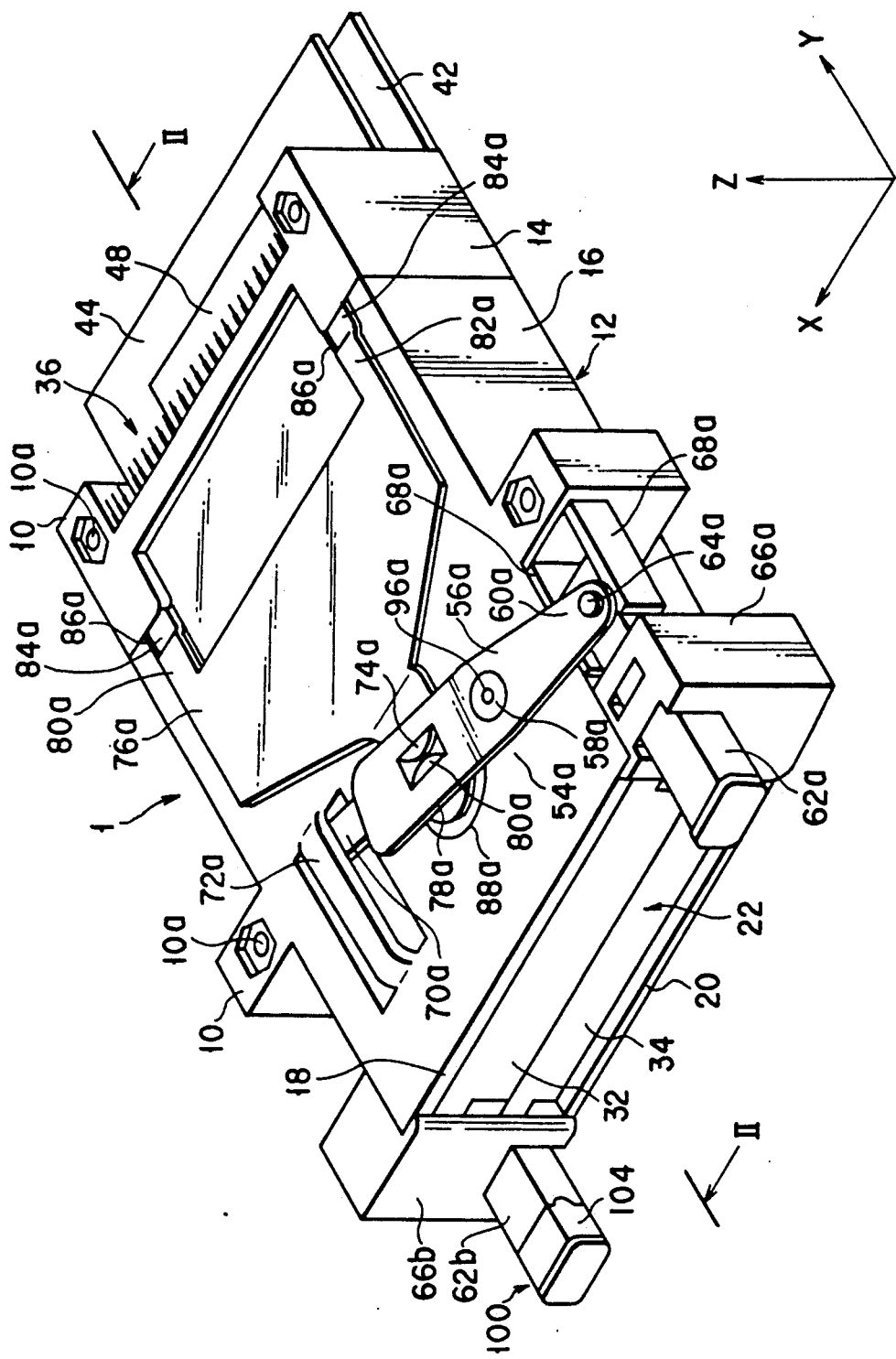
FIG. 1 is a perspective view showing a connector device according to the first embodiment of the present invention.

Referring to FIGS. 1 and 2, the connector device 1 comprises a housing 12 and a connector body 14 coupled to one end thereof in the longitudinal direction. The housing 12 and the connector body 14 are made of an insulating material, e.g., a plastic material. It is possible to detachably connect the connector body 14 to the housing 12 in the known way.

The housing 12 has a pair of side walls 16 defining its two sides and upper and lower housing plates 18 and 20 defining its upper and lower surfaces. The other end of the housing has an insertion port 22.

Mounting members 10 having mounting holes 10a are provided for the connector device 1. The connector device 1 is mounted on a computer system (not shown) such as a personal computer, a laptop computer, or a Notebook-PC or an electronic device (not shown) through the mounting holes 10a.

Figure 3:
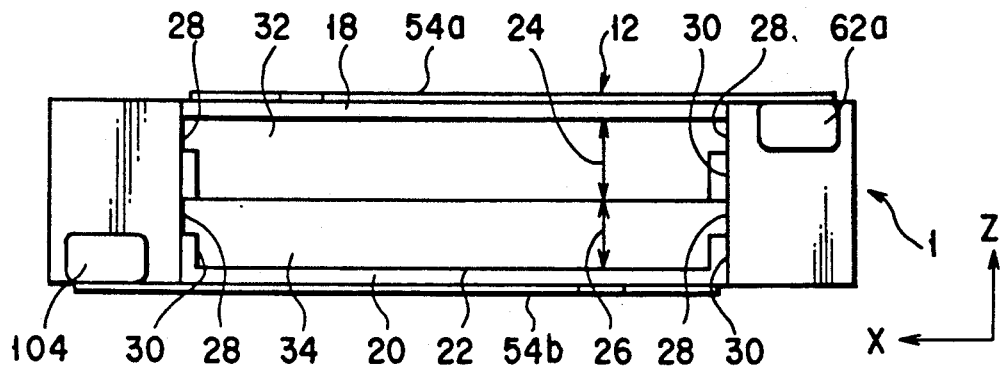
FIG. 3 is a front view of the connector device shown in FIG. 1 in a state wherein the door of an insertion port is closed.
Figure 4:
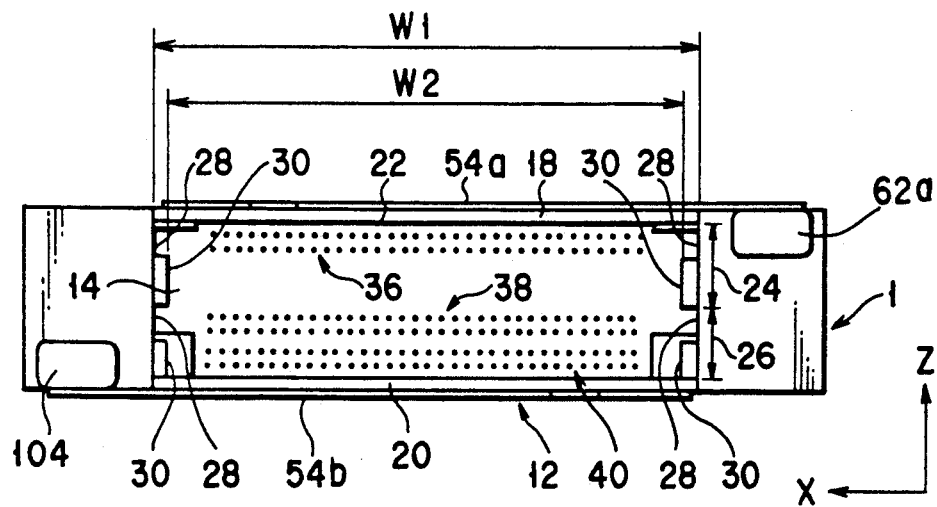
FIG. 4 is a front view of the connector device shown in FIG. 1 in a state wherein the door of the insertion port is open.
Figure 5:
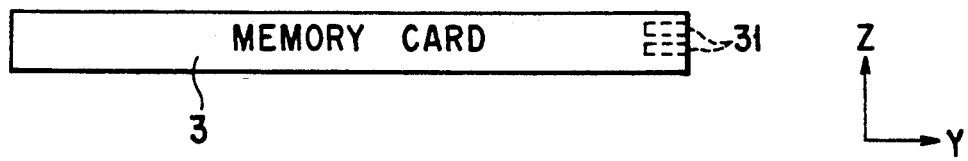
FIG. 5 is a side view showing a memory card used for the connector device in FIG. 1.

As shown in FIGS. 2 to 4, the inner space of the housing 12 communicating with the insertion port 22 is partitioned into first and second decks 24 and 26 along the Z direction. The first and second decks 24 and 26 can receive one memory card each. One HDD package can be received in the inner space of the housing 12 which is constituted by the first and second decks 24 and 26.

A memory card 3 shown in FIG. 3 essentially consists of a RAM (random access memory) incorporated into a card-like device. This memory card 3 represents a non-volatile RAM which, once loaded with data, can be withdrawn from the connector device 1. Sockets in which pin contact arrays 36 and 38 (to be described later) of the connector device 1 are fitted, i.e., an I/O connector 31, are formed in the front end face of the memory card 3.

Figure 6:
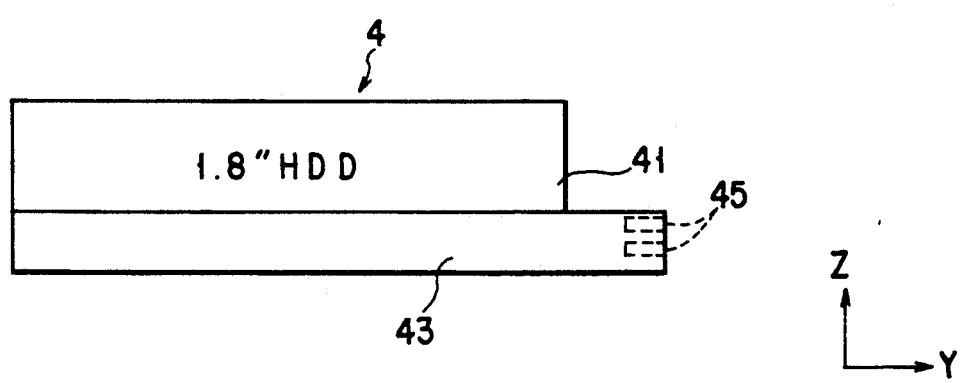
FIG. 6 is a side view showing a hard drive package used for the connector device in FIG. 1.

An HDD package 4 shown in FIG. 6 is a low-profile HDD package comprising, e.g., a low-profile housing 41 receiving a 1.8" disk drive (not shown), and a base plate 43 on which the housing 41 is placed. Sockets in which a lower pin contact array 40 (to be described later) of the connector device 1 is fitted, i.e., an I/O connector 45, are formed in the front end face of the base plate 43. The HDD package 4 has a size of, e.g., 50.8 mm (width)×76.85 or 70 mm (length)×15 mm (height).

The HDD package 4 can be used in the same manner as the memory card 3.

Referring to FIGS. 1 to 4 again, slots 28 are respectively formed in the inner surfaces of the housing side walls 16, along the Y direction, at positions corresponding to the upper portions of the first and second decks 24 and 26, in order to allow the memory card 3 to be loaded/unloaded in/from the housing 12.

In addition, slots 30 are formed in the inner surfaces of the housing side walls 16, along the Y direction, at positions corresponding to the lower portions of the first and second decks 24 and 26, in order to allow the memory card 3 to be loaded/unloaded in/from the housing 12.

An X-direction width $W_1$ of the opposed memory card slots 28 is equal to the width of the memory card 3, e.g., 54 mm, and the X-direction width $W_2$ of the opposed HDD slots 30 is equal to the width of the HDD package 4, e g., 50.8 mm. Since the width $W_1$ of the memory card 3, i.e., the width of the opposed slots 28, is designed to be larger than the width $W_2$ of the HDD package 4, i.e., the width of the opposed slots 30, erroneous insertion of the memory card 3 into the HDD slot 30 is prevented.

The insertion port 22 of the housing 12 preferably has upper and lower doors 32 and 34 in correspondence with the first and second decks 24 and 26. The upper door 32 is pivotally mounted on the front end portion of the upper housing plate 18, whereas the lower door 34 is pivotally mounted on the front end portion of the lower housing plate 20.

When a data storage medium is inserted into the housing 12 through the insertion port 22, these upper and lower doors 32 and 34 are pivoted into the housing 12, as indicated by dotted lines in FIG. 2. In contrast to this, while no data storage medium is present in the housing 12, the upper and lower doors 32 and 34 cover the insertion hole 22, as shown in FIG. 3, thus preventing entrance of dust and minute particles into the housing 12 and preventing short circuit of the pin contact arrays 36, 38, and 40 (to be described later) of the connector body 14. Such operations of the doors 32 and 34 are realized by forming proper springs (not shown).

As especially shown in FIGS. 2 and 4, the connector body 14 has three arrays of pin contacts, each consisting of a conductive metal, stacked in the Z direction. More specifically, the connector body 14 has the upper pin contact array 36, in the first deck 24, which is to be fitted in the I/O connector 31 of the memory card 3, the intermediate pin contact array 38, in the second deck 26, which is to be fitted in the I/O connector 31 of the memory card 3, and the lower pin contact array 40 to be fitted in the I/O connector 45 of the HDD package 4.

Each pin of the upper pin contact array 36 corresponding to the first deck 24 is a straight pin. Each pin of the intermediate pin contact array 38 corresponding to the second deck and of the lower HDD pin contact array 40 is an L-shaped pin.

As especially shown in FIG. 2, the proximal end of each L-shaped pin of the HDD pin contact array 40 is soldered to a circuit board 42.

The circuit board 42 may be a drive controller board, when the HDD package 4 is supplied without the drive controller board for portability purposes. Otherwise, if the HDD package 4 is supplied with the drive controller board, the circuit board 42 may be a mother board (not shown) or a daughter board (not shown) of a computer system.

The proximal end of each L-shaped pin of the intermediate pin contact array 38 for the memory card 3 is soldered to a circuit board 44. In addition, one end 46a of a flexible printed circuit board (or ribbon cable) 46 (shown in only FIG. 2) is soldered to each straight pin of the upper pin contact array 36 for the memory card 3, while the other end of the flexible printed circuit board is connected to a zero insertion force connector 48 of the circuit board 44. According to such design, one circuit board 44 can be commonly used for the two memory cards 3, thus minimizing the board space and achieving high flexibility in circuit layout.

The circuit board 44 is, e.g., an interface board for allowing the mother board to access data in the memory card, and perform input/output operations of the data.

Connection between the circuit boards 42 and 44 can be achieved by having a vertical card connector 50 on the upper surface of the circuit board 42, and a vertical header 52 on the lower surface of the circuit board 42, or vise versa.

According to the above-described connector device 1, the memory card 3 and the HDD package 4 can be selectively mounted in a computer system by housing the memory card 3 in either or both of the upper and lower decks 26 and 28 in the housing 12 or housing one HDD package 4 in the inner space of the housing 12.

When a data storage medium connected to the computer system is to be switched from the memory card 3 to the HDD card and vice versa, switching of circuits is not required. Therefore, the circuit design is facilitated in spite of the fact that the same connector device 1 is commonly used for the two different types of data storage media 3 and 4.

Furthermore, the housing 12 preferably has upper and lower ejection mechanisms 54a and 54b respectively corresponding to the first and second decks 24 and 26. The upper and lower ejection mechanisms 54a and 54b basically have the same arrangement. In the drawings, each component of the upper ejection mechanism 54a is denoted by a reference numeral having the character "a" as a suffix, whereas each component of the lower ejection mechanism 54b is denoted by a reference numeral having the character "b" as a suffix. The upper ejection mechanism 54a will be described below as a representative mechanism unless otherwise specified.

Figure 7:
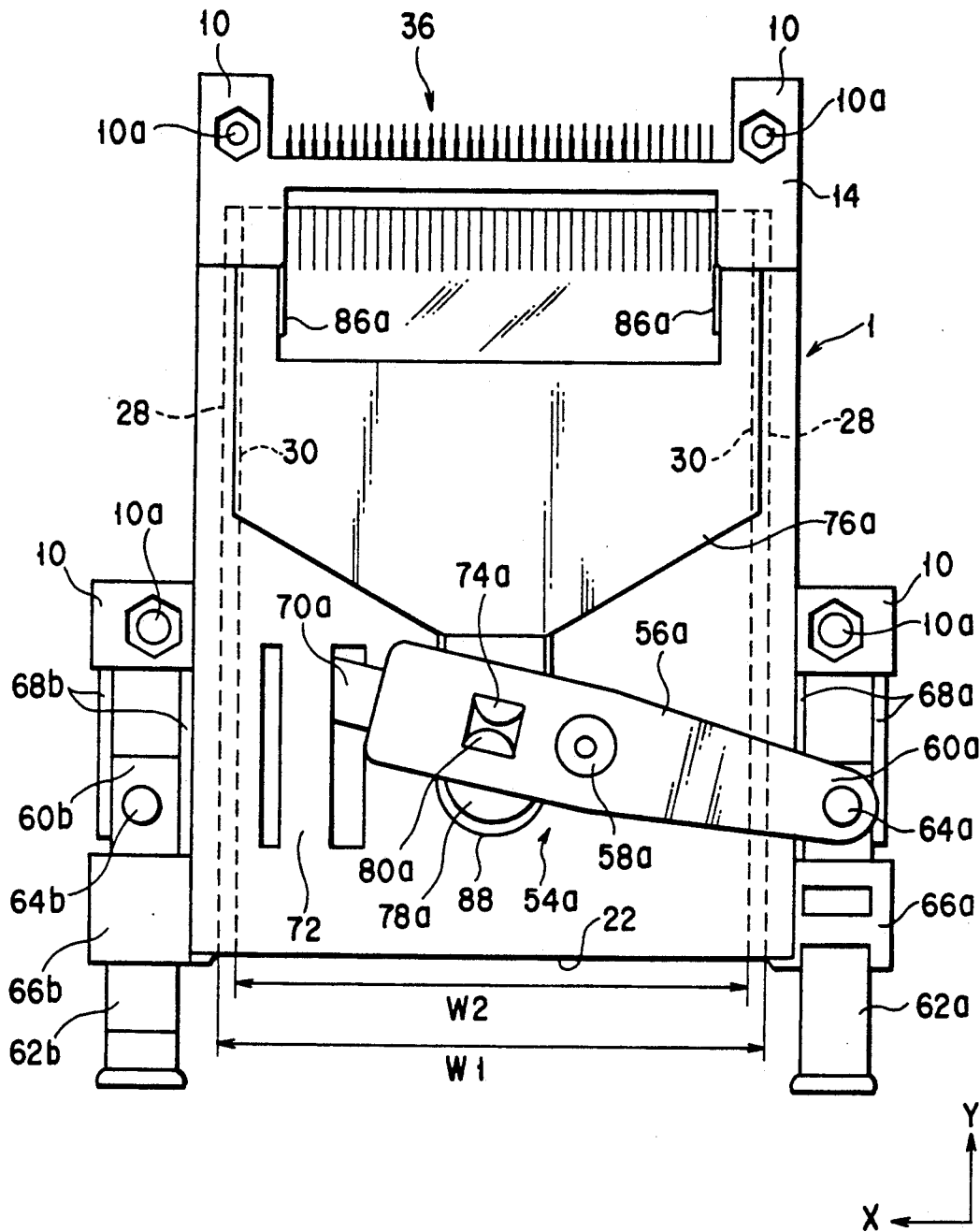
FIG. 7 is a plan view showing an ejection mechanism, of the connector device in FIG. 1, seen from the upper surface side of the connector device.
Figure 8:
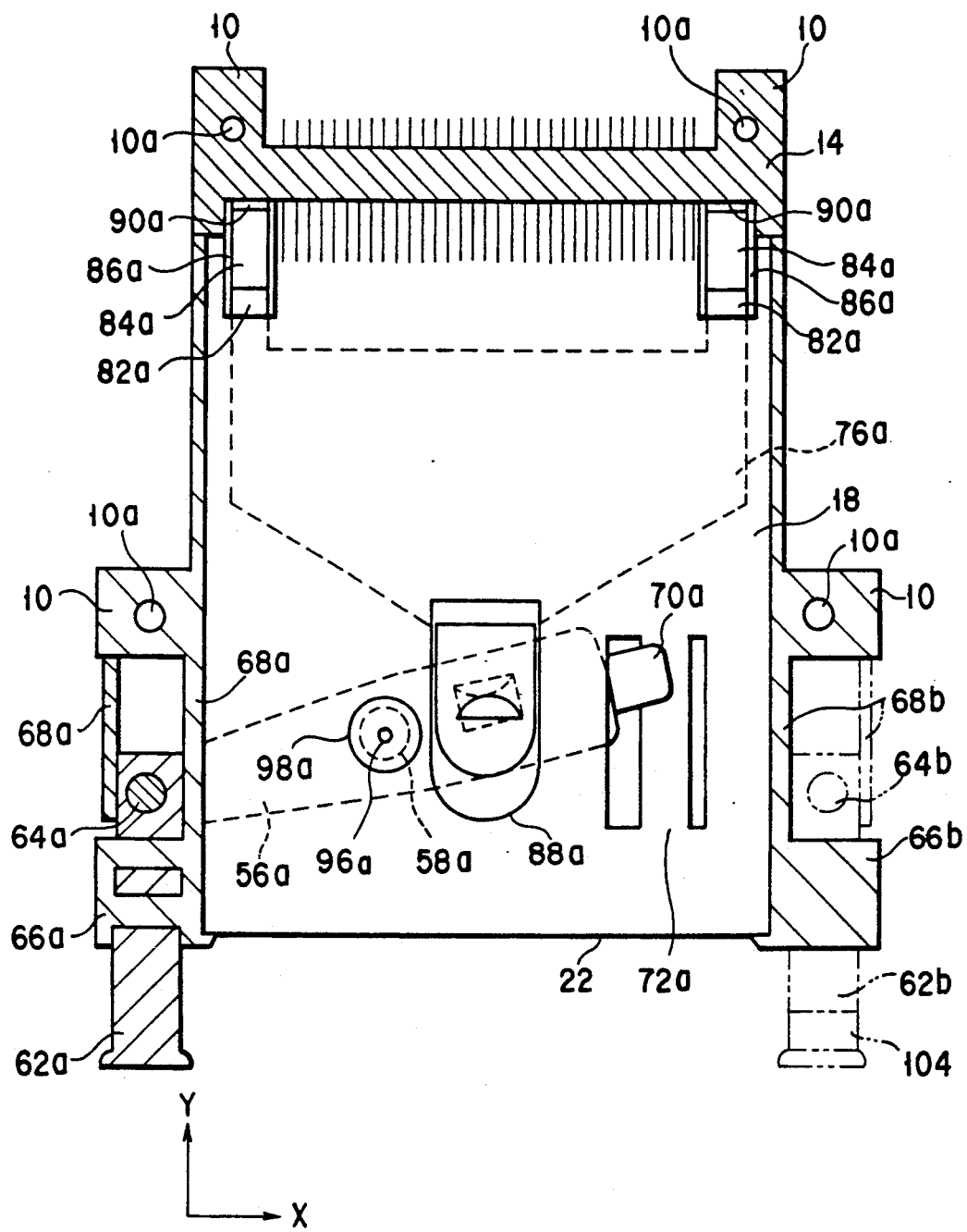
FIG. 8 is a bottom view of the ejection mechanism, of the connector device in FIG. 1, seen from the lower surface side of an upper housing plate.

FIGS. 7 and 8 are views of the upper ejection mechanism 54a respectively seen from the upper and lower surface sides of the upper housing plate 18 of the connector device 1.

In the vicinity of the insertion port 22 of the housing 12, a pivot lever 56a is rotatably supported on the housing plate 18 by a rotation shaft 58a.

One end 60a of the pivot lever 56a is rotatably supported on one end of an ejection slide member 62a by a rotation shaft 64a in order to cause the pivot lever 56a to pivot about the rotation shaft 58a. The slide member 62a slides in guides 66a and 68a, formed on one side wall 16, along the Y direction. The guides 66a and 68a are integrally formed with, e.g., the housing 12.

A tongue 70a is integrally formed on the other end of the pivot lever 56a. The tongue 70a slidably contacts the inner side of a belt-shaped slide guide 72a slightly projecting from the surface of the housing plate 18. The slide guide 72a is formed by, e.g., punching the housing plate 28.

Therefore, when the slide member 62a is manually moved to slide in the Y direction, the pivot lever 56a pivots about the rotation shaft 58a along the upper surface of the housing plate 18.

Furthermore, a claw 74a projecting to the housing plate 18 side is formed on the pivot lever 56a by, e.g., punching.

Figure 9:
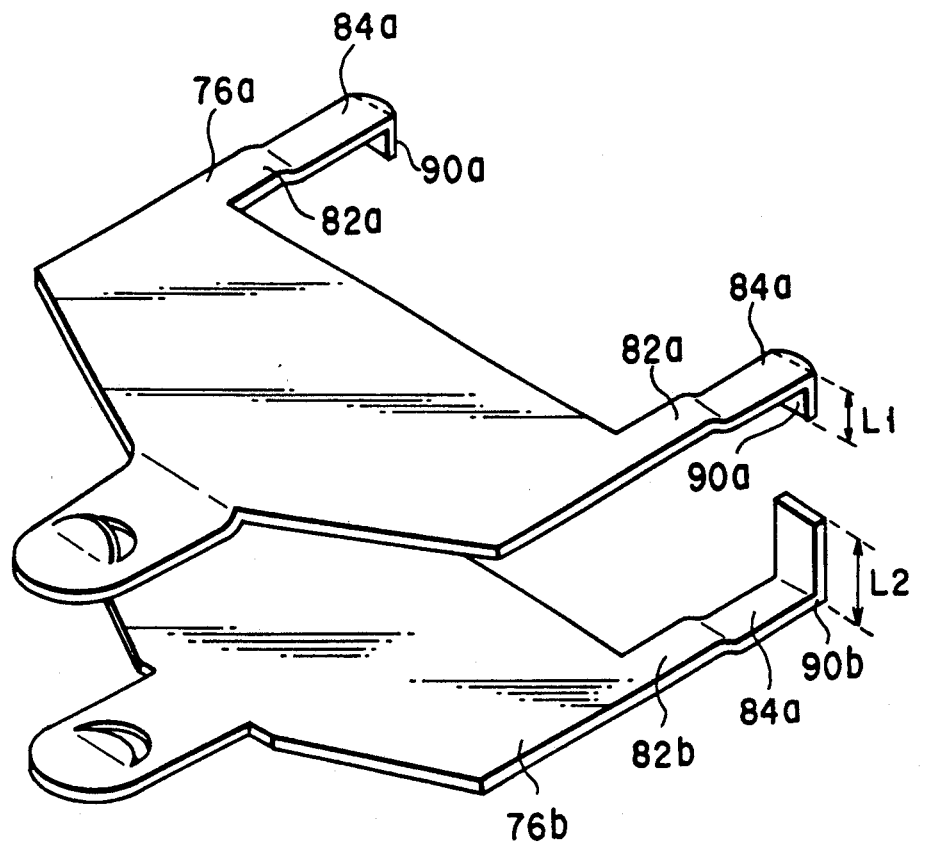
FIG. 9 is a perspective view showing a slide plate of the ejection mechanism of the connector device in FIG. 1.

A slide plate 76a especially shown in FIG. 9 is used to remove the memory card 2, electrically connected to the connector section 14 of the connector device 1, from the connector section 14 when the memory card 3 is not in use. The slide plate 76a has a raised claw 80a at its proximal end 78a. The claw 80a is engageable with the claw 74a of the pivot lever 56a along with the pivotal movement of the pivot lever 56a. Therefore, when the pivot lever 56a is pivoted, the slide plate 76a slides, in the Y direction, on the surface of the housing plate 18. During this sliding, the proximal end 78a of the slide plate 76a, arms 82a (to be described later), and cutouts 86a and 88a (to be described later) of the housing plate 18 serve as slide guides and regulate the X-direction movement of the slide plate 76a.

The arms 82a are formed at two side end portions of the slide plate 76a to extend toward the connector body 14. Bent portions 84a are respectively formed on the arms 82a. The bent portions 84a constitute steps with respect to the slide plate 76a such that they project toward the inner surface of the housing plate 18 via the cutouts 86a formed at two sides of the housing plate 18 on the connector body 14 side. Similarly, the proximal end 78a of the slide plate 76a constitutes a step with respect to the slide plate 76a such that it projects toward the inner surface of the housing plate 18 through a cutout 88a formed in the housing plate 18 Furthermore, the distal ends of the bent portions 84a of the arms 82a are bent to form ejection hooks 90a engaged with the socket side end face of the memory card 2.

Figure 10:
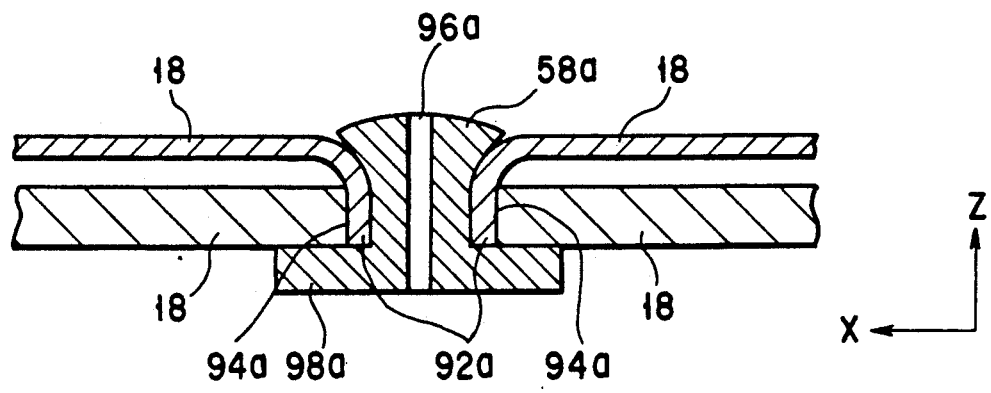
FIG. 10 is a sectional view taken along the Z direction, showing a fulcrum portion of an ejection lever of the ejection mechanism of the connector device in FIG. 1.

FIG. 10 shows the section of the fulcrum portion of the pivot lever 56a.

A cylindrical projection 92a formed on one portion of the pivot lever 56a is engaged with a bearing hole 94a formed in the housing plate 18. The rotation shaft 58a made of, e.g., brass is inserted in the cylindrical projection 92a. The rotation shaft 58a has a through hole at its central portion. A flange 98a is formed on one end of the rotation shaft 58a. The other end of the rotation shaft 58a is caulked to prevent the rotation shaft 58a from being slipped off. Accordingly, the rotation shaft 58a pivots within the bearing hole 94a in accordance with the pivotal movement of the pivot lever 56a. As a result, the rotation shaft 56a is repeatedly pivoted while the inner circumferential surface of the bearing hole 94a of the housing plate contacts the outer circumferential surface of the cylindrical projection 92a of the pivot lever 56a made of the same material. Since both the outer circumferential surface of the cylindrical projection 92a and the inner circumferential surface of the bearing hole 94a have a high wear resistance, the durability of this fulcrum portion of the pivot lever 56a is improved.

The structure of the lower ejection mechanism 54b is basically the same as that of the upper ejection mechanism 54a except the following point. That is, as shown in FIG. 9, a Z-direction length $L_1$ of the ejection hook 90a of the slide plate 76a of the upper ejection mechanism 54a corresponds to the length required for ejection of only the memory 3 in the first deck 24, whereas a Z-direction length $L_2$ of an ejection hook 90b of a slide plate 76b of the lower ejection mechanism 54b is set to allow ejection of both the HDD package 4 and the memory card 3 in the second deck 26.

In addition, the lower ejection mechanism 54b preferably has a locking mechanism 100 for locking the HDD package 4 to prevent loose connection between the I/O connector 45 of the HDD package 4 and the pin contact array 40 when the HDD package 4 is housed in the housing 12.

Figure 11:
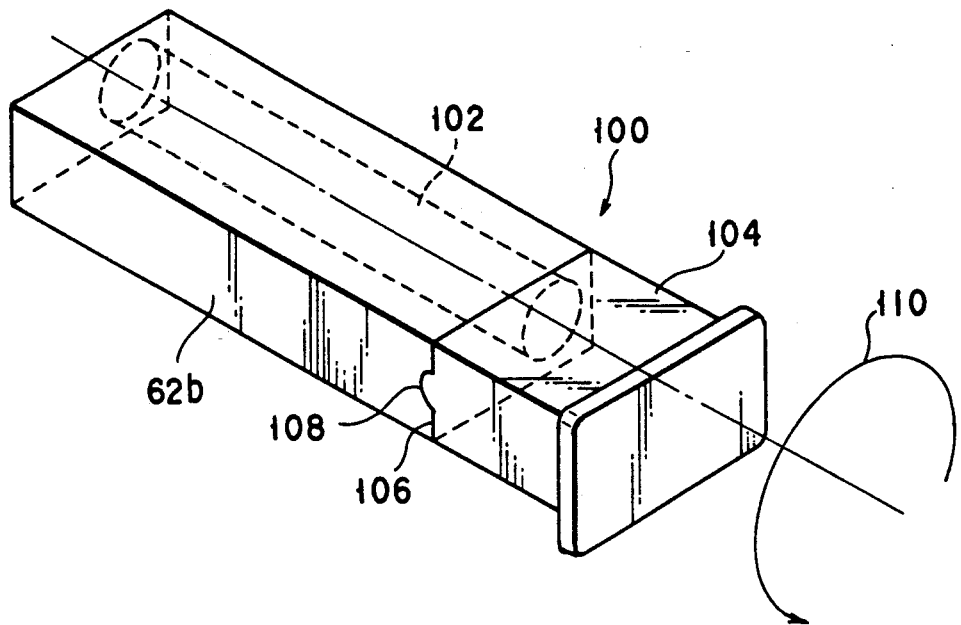
FIG. 11 is a perspective view showing a locking mechanism of the connector device in FIG. 1 in a lock-released state.
Figure 12:
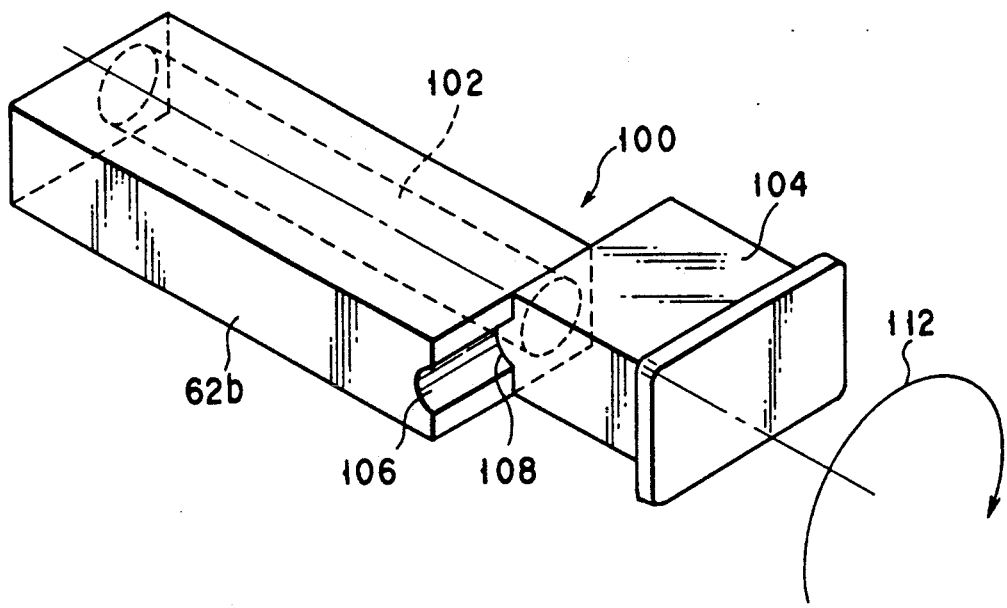
FIG. 12 is a perspective view showing the locking mechanism of the connector device in FIG. 1 in a locked state.

Referring to FIGS. 11 and 12, the locking mechanism 100 includes a rotation shaft 102 inserted in a slide member 62b of the lower ejection mechanism 54b, and a pivot member 104 rotatably supported on the distal end of the slide member 62b by the rotation shaft 102. The pivot member 104 also serves as a handle for operating the slide member 62b. In addition, the rotation shaft 102 can be slightly pulled out from the distal end of the slide member 62 by pulling the handle 104 toward an operator. This operation can be achieved by, e.g., the function of a spring (not shown).

A groove 106 is formed in the distal end face of the slide member 62b. A projection 108 to be engaged with the groove 106 extends from the proximal end face of the handle 104.

The handle 104 is normally located at the pivot position shown in FIG. 11. In this state, the groove 106 of the slide member 62b is completely engaged with the projection 108 of the handle 104.

When the HDD package 4 is housed in the housing 12, the handle 104 is manually pulled out toward the operator, and is subsequently pivoted in a direction indicated by an arrow 110 (FIG. 11) until it reaches the pivot position shown in FIG. 12. In this state, groove 106 and the projection 108 are partly engaged with each other. At this time, the handle 104 extends toward the front end face of the second deck 26 to brought into contact with the rear end face of the HDD package, thus locking the HDD package 4.

When the locked state of the HDD package 4 is to be released, the handle 104 in the state shown in FIG. 12 is pulled out toward the operator and is subsequently pivoted in a direction indicated by an arrow 112 (FIG. 12) to be restored to the initial position shown in FIG. 11. With this operation, the locked state of the HDD package 4 is released.

An operation of the connector device 1 having the upper and lower ejection mechanisms 54a and 54b will be described below. Assume that the connector device 1 is mounted in a computer system and the circuit boards 42 and 44 are properly connected to the computer system.

When the memory card 3 is to be loaded/unloaded in/from the computer system by using the connector device 1, the upper ejection mechanism 54a and/or the lower ejection mechanism 54b are used.

When, for example, one memory card 3 is to be loaded in the computer system, the memory card 3 is inserted into, e.g., the slot 28 of the first deck 24 through the housing insertion port 22 to fit the I/O connector 31 of the memory card 3 on the upper pin contact array 36 of the connector body 14. With this operation, the computer system and the memory card 3 are connected to each other.

At this time, the front end face of the memory card 3, is engaged with the ejection hooks 90a of the slide plate 76a. When the slide plate 76a is moved forward, the pivot level 56a is also pivoted about the rotation shaft 78a. As a result, the slide member 62a extends from the end face of the housing 12 on the insertion port 22 side.

In order to release the engagement of the memory card 3, the slide member 62a is pushed to cause the pivot lever 56a to pivot about the rotation shaft 56a. The pivot lever claw 74a is then engaged with the slide plate claw 80a, and the slide plate 76a moves on the surface of the housing plate 18 along the Y direction. Upon this movement, the memory card 3 is released from the pin contact array 36 by the ejection hooks 90a, and the memory card 3 is removed from the connector body 14.

When one memory card 3 is inserted in the second deck 26 to be fitted on the intermediate pin contact array 38, the memory card 3 can be unloaded by using the lower ejection mechanism 54b in the same manner as described above.

In addition, since the upper and lower ejection mechanisms 54a and 54b can be independently operated, when two memory cards 3 are housed in the connector device 1 at once, the two memory cards can be independently loaded/unloaded in/from the computer system. For example, while data is loaded from on memory card 3 into the computer system, the connection between the other memory card 3 and the computer system can be released.

In contrast to this, when the HDD package 4 is to be loaded/unloaded in/from the computer system, only the lower ejection mechanism 54b is used.

When the HDD package 4 is to be loaded in the computer system, the HDD package 4 is inserted into the housing 12 through the housing insertion port 22, and the HDD I/O connector 45 is guided by the slot 30 to be fitted on the lower pin contact array 40. With this operation, the computer system and the HDd package 4 are connected to each other. In this state, the ejection hooks 90b of the slide plate 76b of the lower ejection mechanism 54b are engaged with the side end face of the I/O connector 45 of the HDD package 4. The HDD package 4 can be loaded/unloaded in/from the computer system in the same manner as the memory card 3.

FIGS. 13 to 18 show the second embodiment of the present invention. The same reference numerals in the respective drawings associated with the second embodiment denote the same parts as in the first embodiment. A connector device according to this embodiment is capable of selectively housing one or two memory cards 3 (FIG. 5) or one HDD package 4 (FIG. 6) as a data storage medium.

Figure 13:
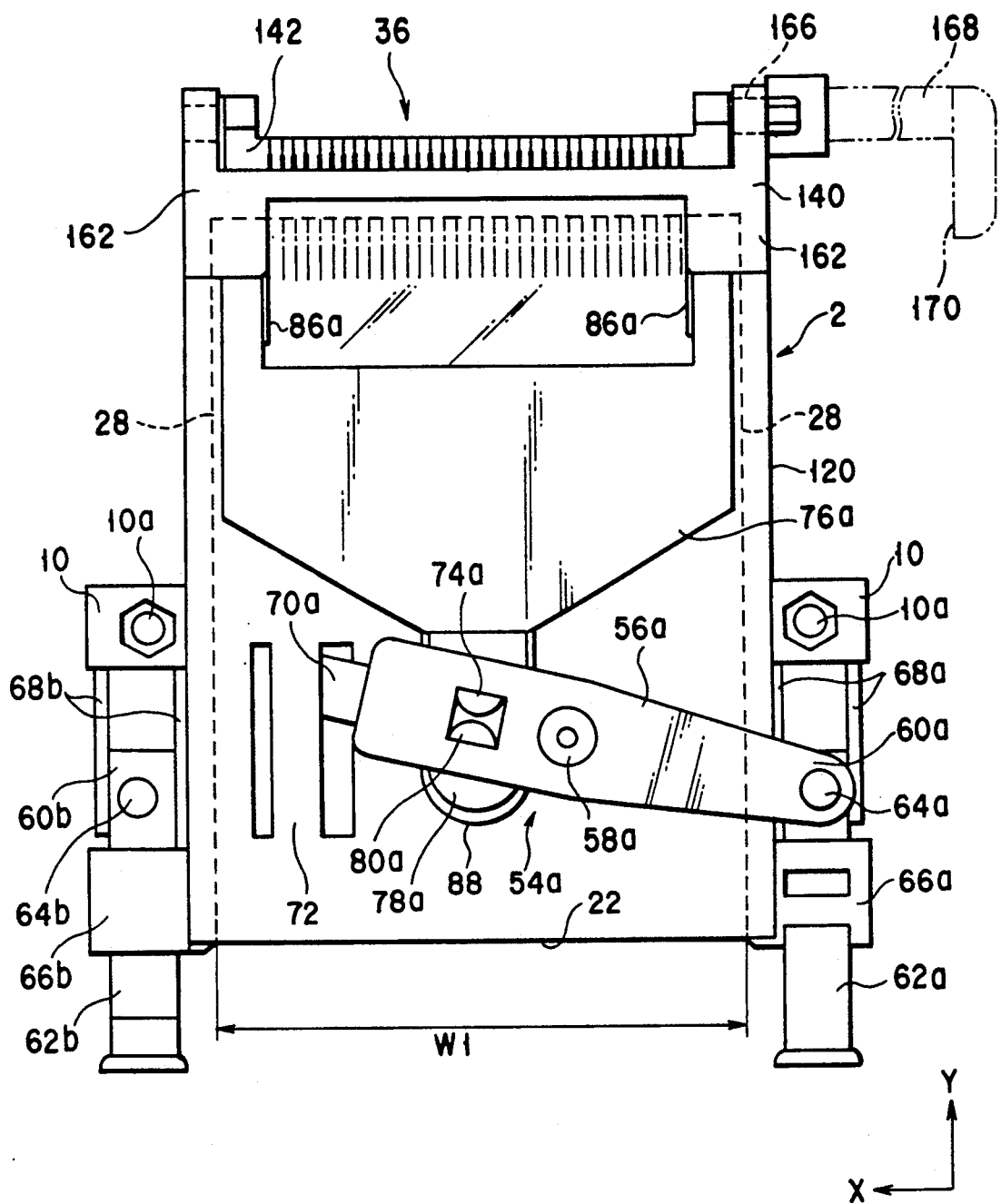
FIG. 13 is a plan view of a connector device according to the second embodiment of the present invention.

As shown in FIG. 13, a connector device 2 comprises a housing 120 and a connector body 140 coupled to one end thereof in the Y direction.

The housing 120 is substantially the same as that in the first embodiment except for the following several points.

Figure 14:
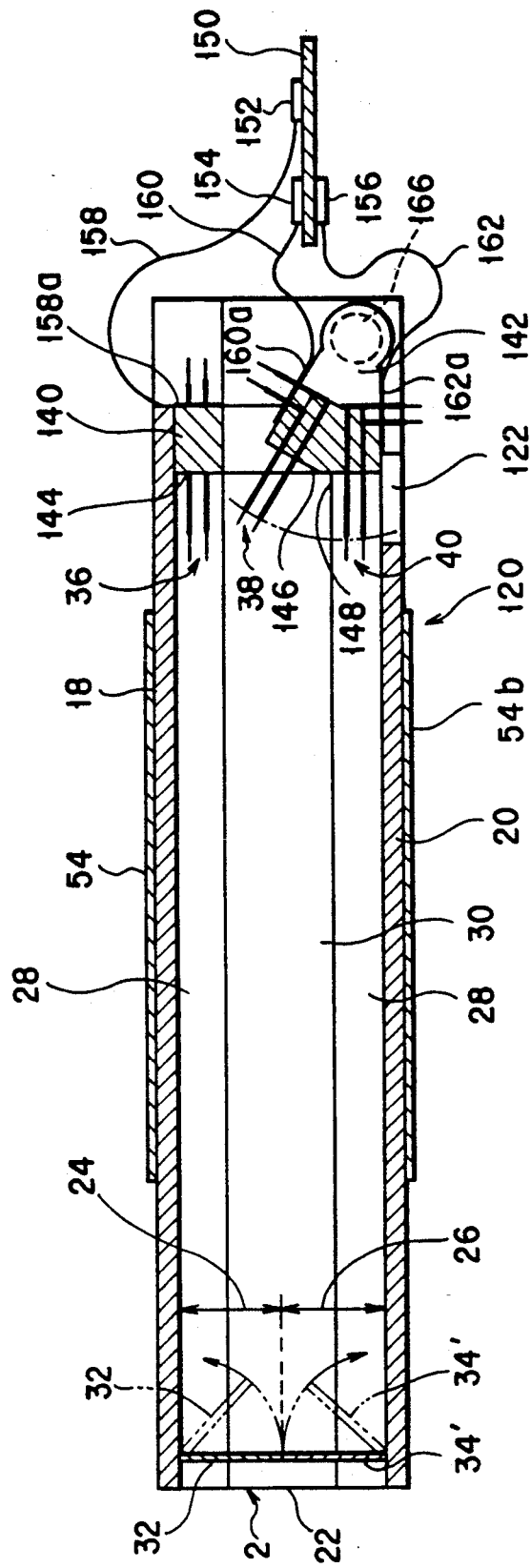
FIG. 14 is a sectional view of the connector device shown in FIG. 13 in a state wherein a pivot arm is switched to a memory card I/O.
Figure 15:
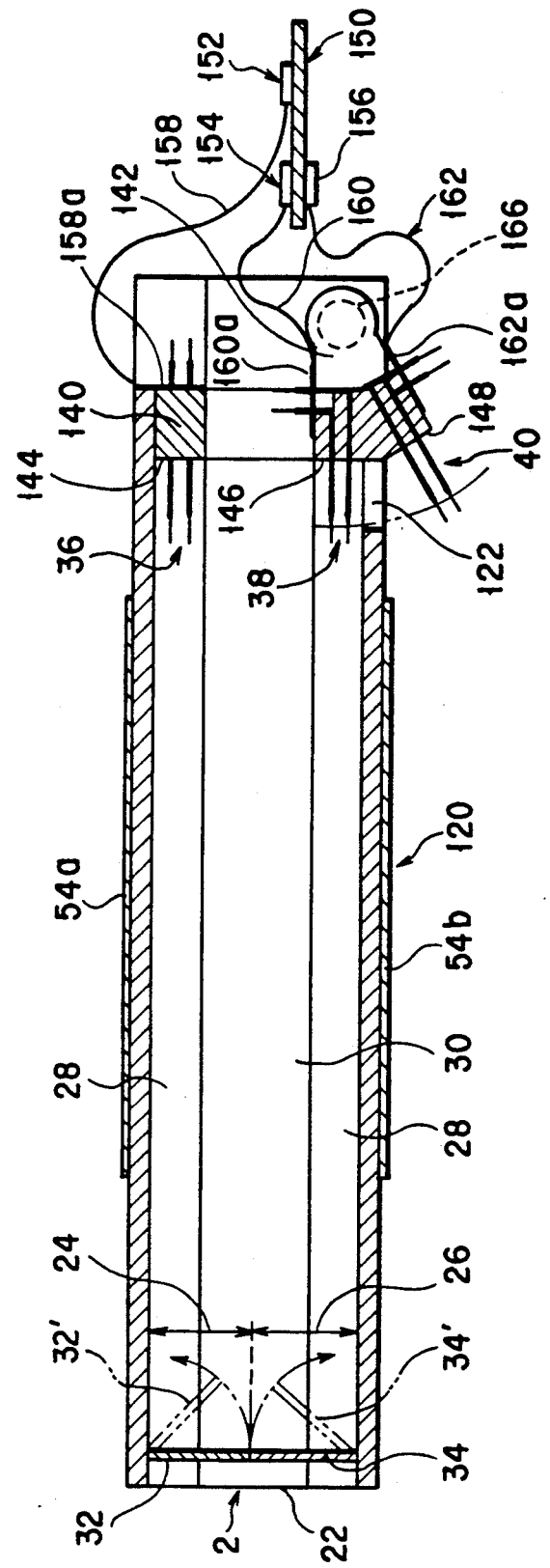
FIG. 15 is a sectional view of the connector device shown in FIG. 13 in a state wherein the pivot arm is switched to a hard disk drive I/O.

Firstly, as shown in FIGS. 14 and 15, a cutout 122 is formed at one end of a bottom housing plate 20 on the connector body 140 side.

Figure 16:
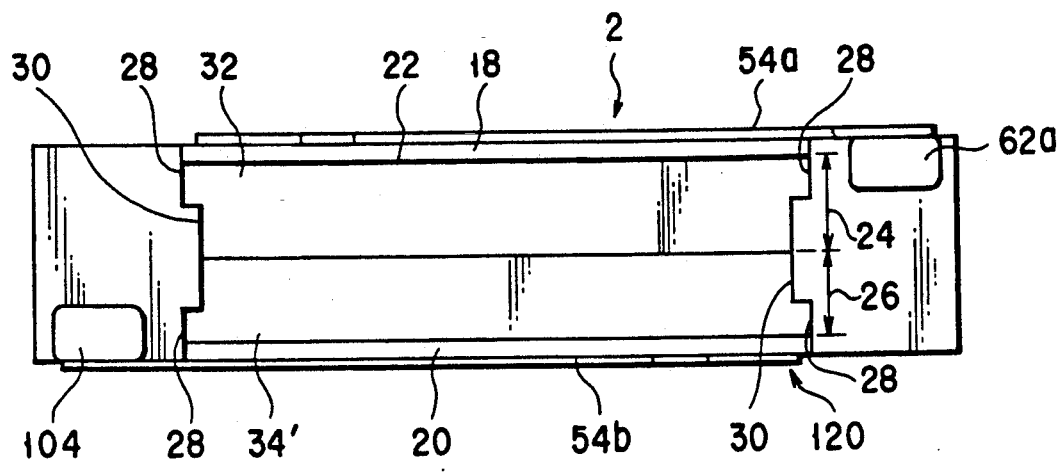
FIG. 16 is a front view of the connector device shown in FIG. 13 in a state wherein the door of an insertion port is closed.

Secondly, as shown in FIGS. 14 to 16, a memory card slot 28 in a second deck 26 is formed at the lower side of the second deck 26, i.e., on the inner surface of the bottom housing plate 20.

Thirdly, as shown in FIGS. 14 to 16, an HDD slot 30 is continuously formed between the lower side of a first deck 24 and the upper side of the second deck 26.

Upper and lower doors similar to the lower and upper doors 32 and 34 in the first embodiment may be formed at an insertion port 22 of this housing. In this case, the shape of an upper door 32 is the same as that in the first embodiment. The shape of a lower door 34' is set to be different from that of the lower door 34 in accordance with changes in position of the slots 28 and 30 in the second deck 26, as shown in FIG. 16.

Figure 17:
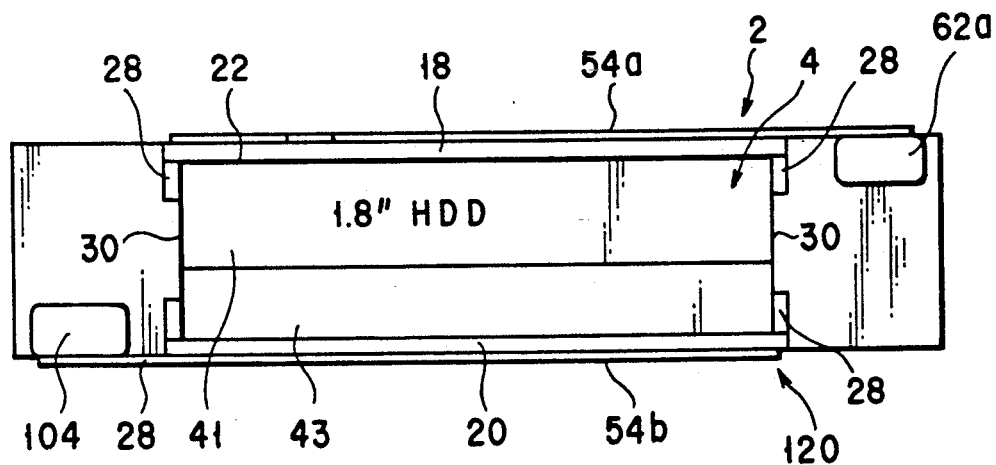
FIG. 17 is a front view of the connector device shown in FIG. 13 in a state wherein a hard disk drive package is inserted in a housing.

When the HDD package 4 is inserted into the inner space, of the housing 12, constituted by the first and second decks 24 and 26, as shown in FIG. 17, substantially the central portion between two side surfaces of the HDd package 4 is supported by the slot 30 in accordance with the changes in position of the slots 28 and 30.

Referring to FIGS. 14 and 15 again, the connector body 140 of the connector device 2 includes three pin contact arrays 36, 38, and 40 similar to those of the connector body 14 in the first embodiment. Of these arrays, the intermediate and lower pin contact arrays 38 and 40 are respectively mounted on pivot surfaces 146 and 148 of a pivot arm 142 (to be described later) with a proper mounting angle c defined between the arrays 38 and 40. In addition, the upper pin contact array 36 is mounted on a fixed surface 144 of the connector body 140 in the first deck 24.

The distal ends of the pins of the pin contact arrays 36, 38, and 40 respectively extend in the directions normal to the mounting surfaces 144, 146, and 148.

The respective pin contact arrays 36, 38, and 40 may be connected to a common interface board 150. Three zero insertion force connectors 152, 154, and 156 are mounted on this common interface board 150.

In this case, one end 158a of a flexible printed circuit board 158 is soldered to the proximal end side of the upper pin contact array 36. The other end of the board 158 is connected to the zero insertion force connector 152 of the common interface board 150.

In addition, one end 160a of a flexible printed circuit board 160 is soldered to the proximal end side of the intermediate pin contact array 38. The other of the board 160 is connected to the zero insertion force connector 154 of the common interface board 150.

Similarly, one end 162a of a flexible printed circuit board 162 is soldered to the proximal end side of the lower pint contact array 40. The other end of the board 162 is connected to the zero insertion force connector 156 of the common interface board 150.

In this manner of connection, the number of circuit boards required to connect the connector device 2 to a computer system can be minimized.

Figure 18:
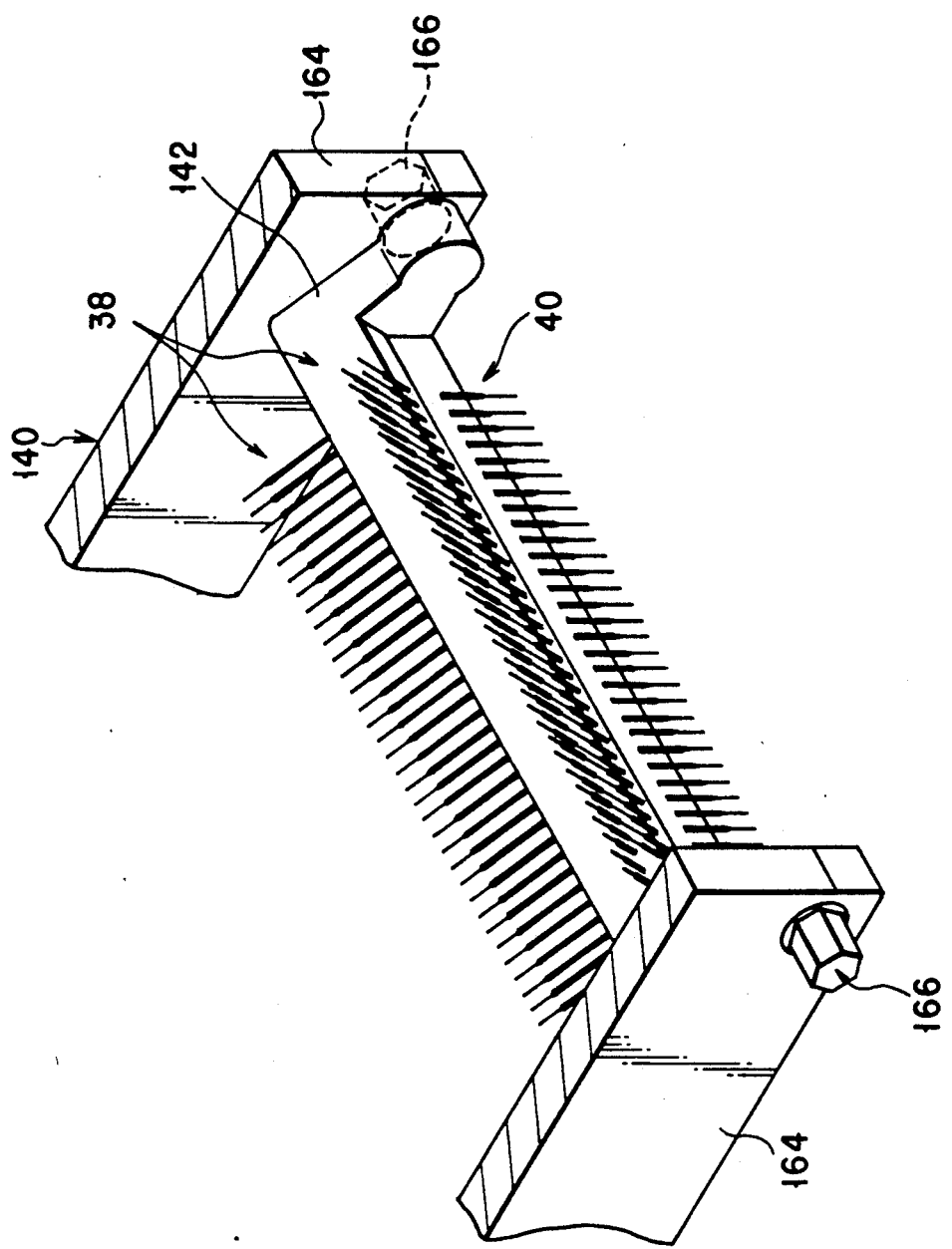
FIG. 18 is a perspective view showing the pivot arm of the connector device in FIG. 13.
Figure 19:
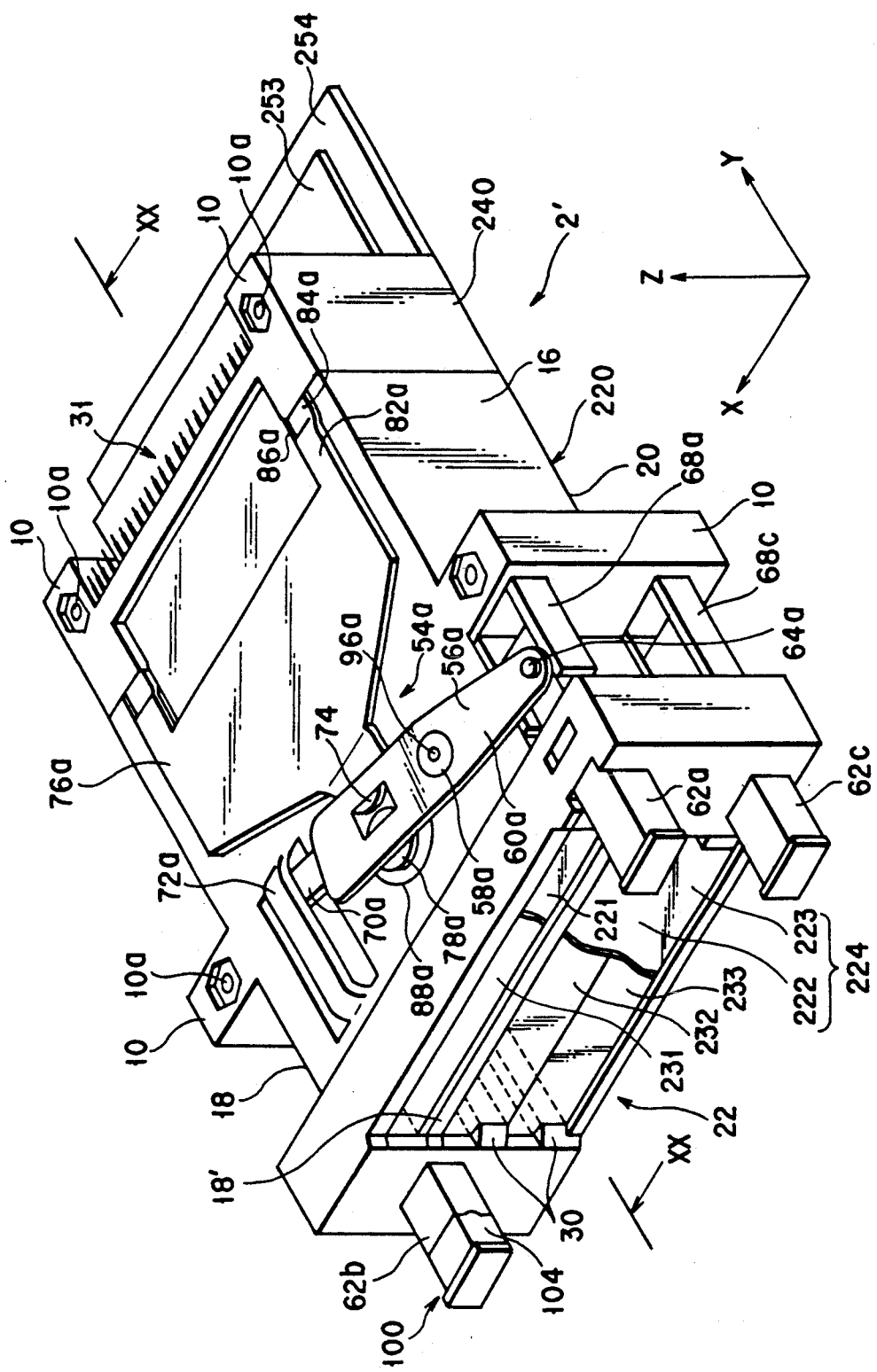
FIG. 19 is a perspective view showing a connector device according to the third embodiment of the present invention.

Referring to FIG. 18, the pivot arm 142 rotatably supported between a pair of side walls of the connector body 140 by a rotation shaft 166 to extend in the X direction. This pivot arm 142 serves to selectively switch the intermediate and lower pin contact arrays 38 and 40 in accordance with its pivot position to position one of them at the slot 28 in the second deck 26.

. As shown in FIG. 13, an extended switching arm 168 is mounted on one end of the rotation shaft 166 of the pivot arm 142 to extend outward from the casing of the computer system. By manually operating a lever 170 at the distal end of the switching arm 168, switching of the pin contact arrays 38 and 40 can be performed from the outside of the casing of the computer system by using the pivot arm 142.

The connector device 2 of the second embodiment preferably has upper and lower ejection mechanisms 54a and 54b similar to those in the first embodiment.

An operation of the connector device 2 of the second embodiment will be described below.

The switching position, of the pivot arm 142, shown in FIG. 14 is the switching position for a memory card I/O connector. In this state, the pivot surface 148 having the lower pin contact array 40 mounted thereon is located on a line extending from the fixed surface 144 having the upper pin contact array 36 mounted thereon, while the distal end of each L-shaped pin of the lower pin contact array 40 is parallel to the direction in which the slot 28 in the second deck 26 extends.

The lower pin contact array 40, therefore, can be fitted in an I/O connector 31 of the memory card 3 in the second deck 26.

In contrast to this, since the intermediate pin contact array 38 on the pivot surface 146 is directed upward, the array 38 cannot be fitted in the I/O connector 31 of the memory card 3 in the deck 24 and/or the deck 26 and does not interfere with the memory card 3.

The switching position, of the pivot arm 142, shown in FIG. 15 is the switching position for an HDD I/O connector. In this state, the pivot surface 146 having the intermediate pin contact array 36 mounted thereon is located on a line extending from the fixed surface 144 having the upper pin contact array 36 mounted thereon, while each L-shaped pin of the intermediate pin contact array 38 is parallel to the direction in which the slot 28 in the second deck 26 extends.

The intermediate pin contact array 38, therefore, can be fitted in an I/O connector 45 of the HDD package 4 in the housing 120. In contrast to this, the lower pin contact array 40 extends outward from the housing 120 through the cutout 122 of the bottom housing plate 20 and hence cannot be used.

Data storage medium are loaded or unloaded by the upper and lower ejection mechanisms 54a and 54b in the same manner as in the first embodiment.

FIGS. 19 to 23 disclose a third embodiment of the present invention. The same reference numerals in the respective drawings associated with the third embodiment denote the same parts as in the first embodiment.

The connector device 2' of the third embodiment can be applied to one to three memory cards 3 (FIG. 5), or one HDD package 4, or a memory card 3 and HDD package 4 (FIG. 6).

The connector device 2' comprises a housing 220 and a connector body 240 coupled to the rear end thereof in the Y direction.

Since the basic structure of the housing 220 of the third embodiment are substantially the same as the housing 12 of the first embodiment, an explanation will be restricted only to their difference.

Figure 20:
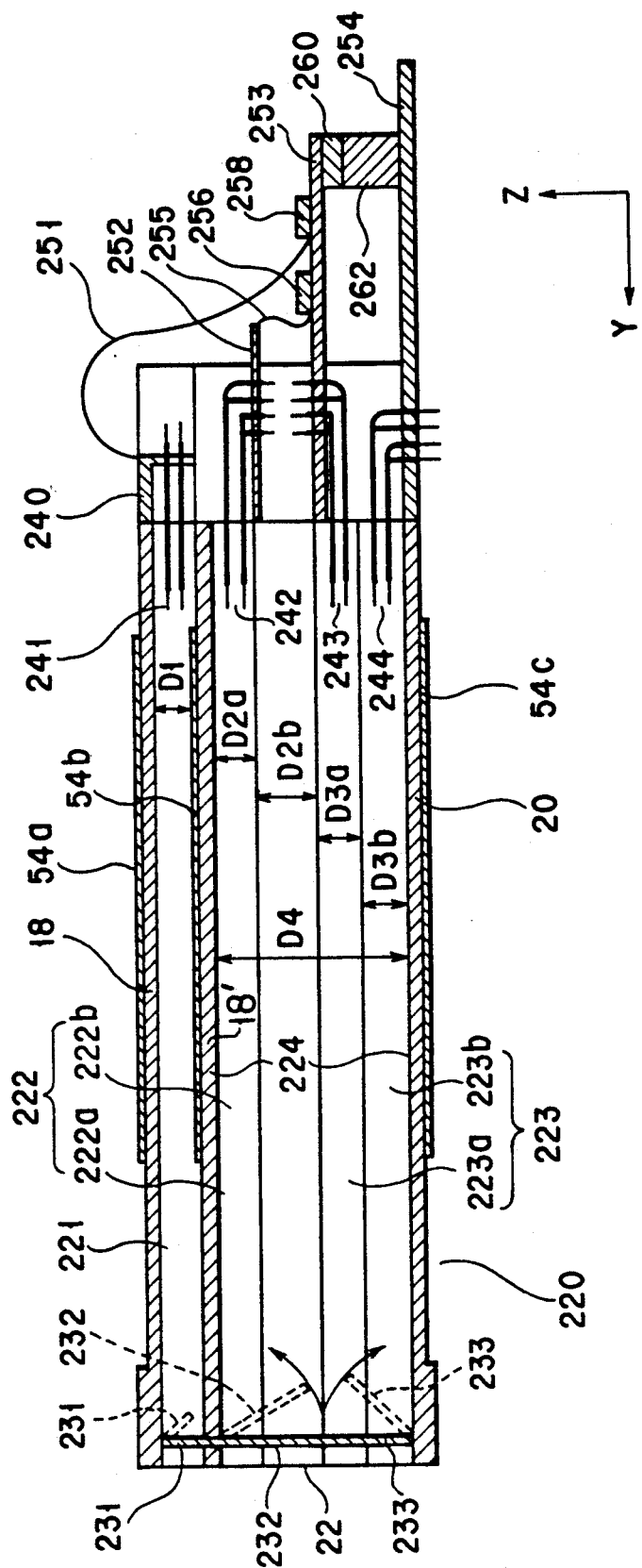
FIG. 20 is a cross-sectional view as taken along line XX—XX in FIG. 19.

As shown in FIG. 20 in particular, the inner space of the housing 220 communicating with the insertion inlet 22 provides first, second and third decks 221, 222 and 223 along the Z direction. The first and second decks 221 and 222 are separated by the partition plate 18'.

The second and third decks 222 and 223 communicate with each other in the Z direction and, being combined together, provide a double deck 224.

A memory card 3 can be held in each of the first to third decks 221, 222, and 223. One HDD package 4 can be held in the double deck 224 instead of two memory cards.

Further, the first deck 221 is of a memory card-only type and has a Z-direction dimension $D_1$ conforming to the height H, for example, 3.5 mm, of the memory card 3.

The second deck 222 has an upper deck 222a and a lower deck 222b and the third deck 223 has a upper deck 223a and a lower deck 223b. At the second and third decks 222 and 223, the respective upper decks 222a and a only hold one memory card each. Hence the Z direction dimensions $D_{2a}$ and $D_{3a}$ of the upper decks 222a and 223a conform to the height $H_M$ of the memory card 3.

The Z direction dimension $D_4$ of the double deck 224 is equal to the height $H_H$ of HDD package 4 and given below:

$$D_4 = H_H$$
$$= D_{2a} + D_{2b} + D_{3a} + D_{3b}$$
$$= 2 \times H_M + D_{2b} + D_{3b}$$

where
$D_{2b}$ and $D_{3b}$ denote the Z direction dimensions of the lower decks 222b and 223b of the second and third decks 222 and 223, respectively.

The dimensions $D_{2b}$ and $D_{3b}$, if so properly set, can hold a pair of memory cards or one HDD package.

Figure 21:
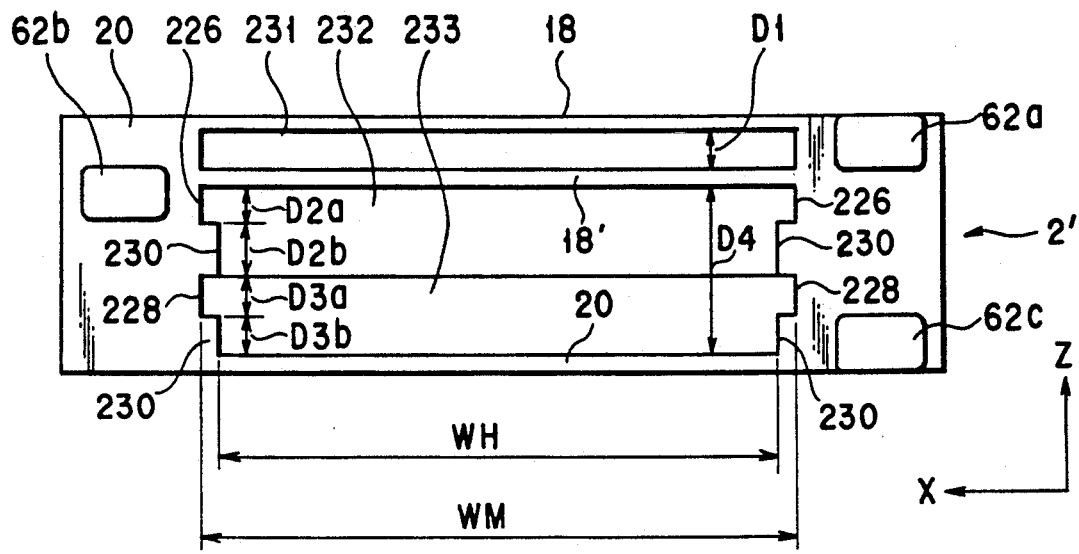
FIG. 21 is a front view showing the connector device of FIG. 19 with doors closed.
Figure 22:
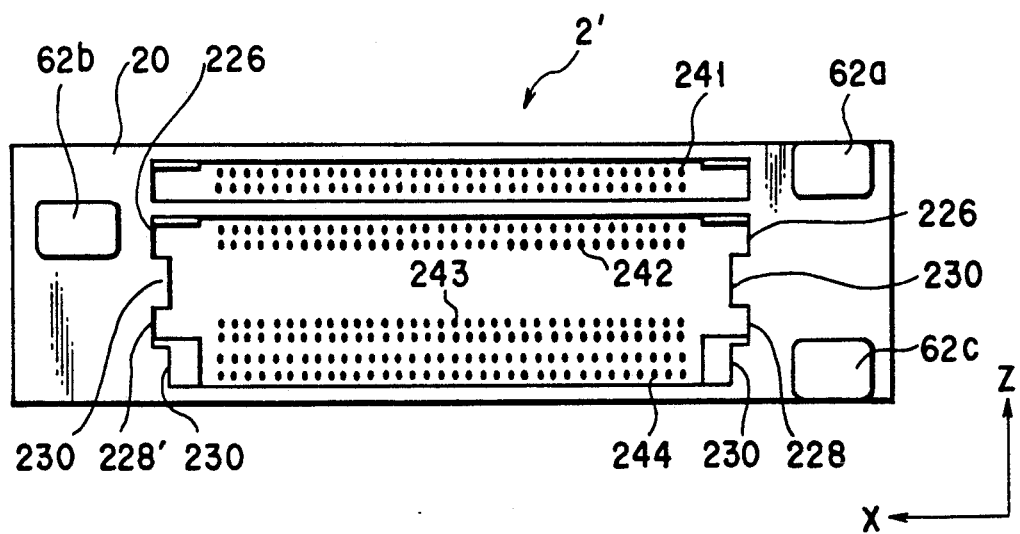
FIG. 22 is a front view showing the connector device of FIG. 19 with the doors opened.

As shown in FIGS. 21 and 22, guide slots 226 and are provided, along the Y direction, in the inner walls of the housing's side walls 16 at the upper decks 222a and 223a of the second and third decks 222 and 223 so as to allow an access of the memory card 3 there.

Guide slots 230 are provided, in the Y direction, in the inner walls of the housing's side walls 16 at the lower decks 222b and 223b of the second and third decks 222 and 223.

The distance (X direction) between a pair of memory card guide slots 226 correspond to the width $W_M$ of the memory card 3, for example, 54 mm, the distance (X direction) between a pair of memory card guide slots 228 to the width $W_M$, and the distance (X direction) between a pair of HDD guide slots 230 to the width $W_H$ of HDD package, for example, 50.8 mm.

In a design layout of the memory card 3 whose width $W_M$ is greater than the width $W_H$ of HDD package, the memory card 3 is prevented from being erroneously inserted into the HDD guide slot 230.

The insertion inlet 22 of the housing 220 has first, second and third doors 231, 232 and 233 corresponding to the first, second and third decks 221, 222 and 223. The first door 231 is rotatably mounted at the front end side of the upper housing plate 18, the second door 232 is rotatably mounted at the front end side of the partition plate 18', and the third door 233 is mounted at the front end side of the bottom housing plate 20.

The first, second and third doors 231, 232 and 233 are each provided for one memory card 3 and the two doors 232 and 233 are provided as a double deck's door for one HDD package 4.

When a data storage medium is to be inserted into the housing 220 via the insertion inlet 22, the first and second doors 231 and 232 are rotated, as indicated by dotted lines in FIG. 20, with their upper end used as a fulcrum. The third door 233 is rotated toward the inside of the housing 220 with its end as a fulcrum.

When, for example, the memory cards are to be inserted into the first, second and third decks 221, 222 and 223, the first, second and third doors 231, 232 and 233 are rotated independently.

When, on the other hand, HDD package 4 is to be inserted into the double deck 224, the front end side of HDD package is abutted against the second and third doors 232 and 233 are opened simultaneously.

When any data storage medium is not occupied in the housing 220, the first, second and third doors 231, 232 and 233 close the insertion inlet 22, preventing intrusion of dirt and fine particles into the inside of the housing. It is thus possible to prevent the short-circuiting of the pin contact groups 241, 242, 243 and 244 of the contact body 240 as will be set out below. Such an operation of the open/close doors 231, 232 and 233 is achieved by a proper spring means, not shown.

As shown in FIG. 20 in particular, the connector body 240 has four sets of pin contact groups, in the Z direction, made of an electroconductive metal, that is, pin contact groups 241, 242 and 243 for the first, second and third memory cards corresponding to the first, second and third decks 221, 222 and 223 and a pin contact group 244 to be fitted into I/O connector 55 of HDD package 4 in the double deck 224.

Those pins constituting the first pin contact group 241 for a card correspond to the first deck 221 and are comprised of straight pins. Those pins constituting pin contact groups 242 and 243 for second and third cards correspond to the upper decks 222a and 223a of the second and third decks 222 and 223 and are comprised of L-shaped pins. Those pins constituting the pin contact group 224 for HDD correspond to the lower deck 223 and are comprised of L-shaped pins.

The connector device 2' preferably includes a connection circuit board as shown in FIG. 20. A first flexible printed circuit board or ribbon cable 251 is soldered at one end to the respective straight pins in the first pin contact group 241 for the memory card.

The respective L-shaped pins on the second pin contact group 242 for the memory card are mounted at their base end to the connection base 252 and soldered there. A second flexible printed circuit board or a ribbon cable 255 is soldered at one end to a connection board 252. The connection board 252 serves as an interface board for connecting the second pin group 242 to a circuit board for the memory card as will be set out below.

Those L-shaped pins on the third pin contact group 38 for the memory card are mounted at their base end to the circuit board 253 for the memory card and soldered there. The circuit board 253 for the memory card serves as an interface circuit board for allowing the input or output of data of, for example, the memory card 3 to and from a mother board through access. Two zero insertion force connectors 256 and 258 are attached to the circuit board 253 for the memory card. The first and second flexible printed circuit boards or ribbon cables 251 and 255 are connected at the other end to the corresponding zero insertion force connectors.

In such a design layout, the circuit board 253 for one memory card can be commonly employed for a plurality of memory card 3. This ensures a minimal board space and high flexibility with which an associated circuit is laid out.

Those L-shaped pins in the pin contact group 244 for HDD are mounted at their base end to a circuit board 254 for HDD.

The circuit board 254 may be a mother board, not shown, or a daughter board, not shown, of the computer system in the case where HDD package 4 is equipped with a disc drive control board. Alternatively, the circuit board 254 may be a disc drive control circuit board in the case where HDD package 4 is not equipped with the disc drive control circuit board so as to provide a portable unit.

The circuit connection between the circuit board 253 for the memory card and the circuit board 254 for HDD is achieved by providing a vertical card connector 260 on the upper surface of the circuit board 254 and a vertical header 262 on the undersurface of the circuit board or in the reverse way.

In accordance with the connector device 2', a memory card 3 can be held in the housing 220 at at least one of the three decks 221, 222 and 223 or one HDD package 4 can be held in the double deck 224. In the case where one HDD package 4 is held in the double deck 224, the memory card 3 can also be held in the housing at the first deck 221. It is thus possible to selectively attach the memory card 3 and HDD package 4 to the computer system.

Further, it is not necessary to switch one circuit to another when a data storage medium connected to the computer system is exchanged from the memory card 3 to HDD package 4 or from HDD package 4 to the memory card 3. It is thus possible to implement a ready circuit design in spite of the fact that the connector device 2' is commonly used for the two different kinds of data storage media 3 and 4.

Figure 23:
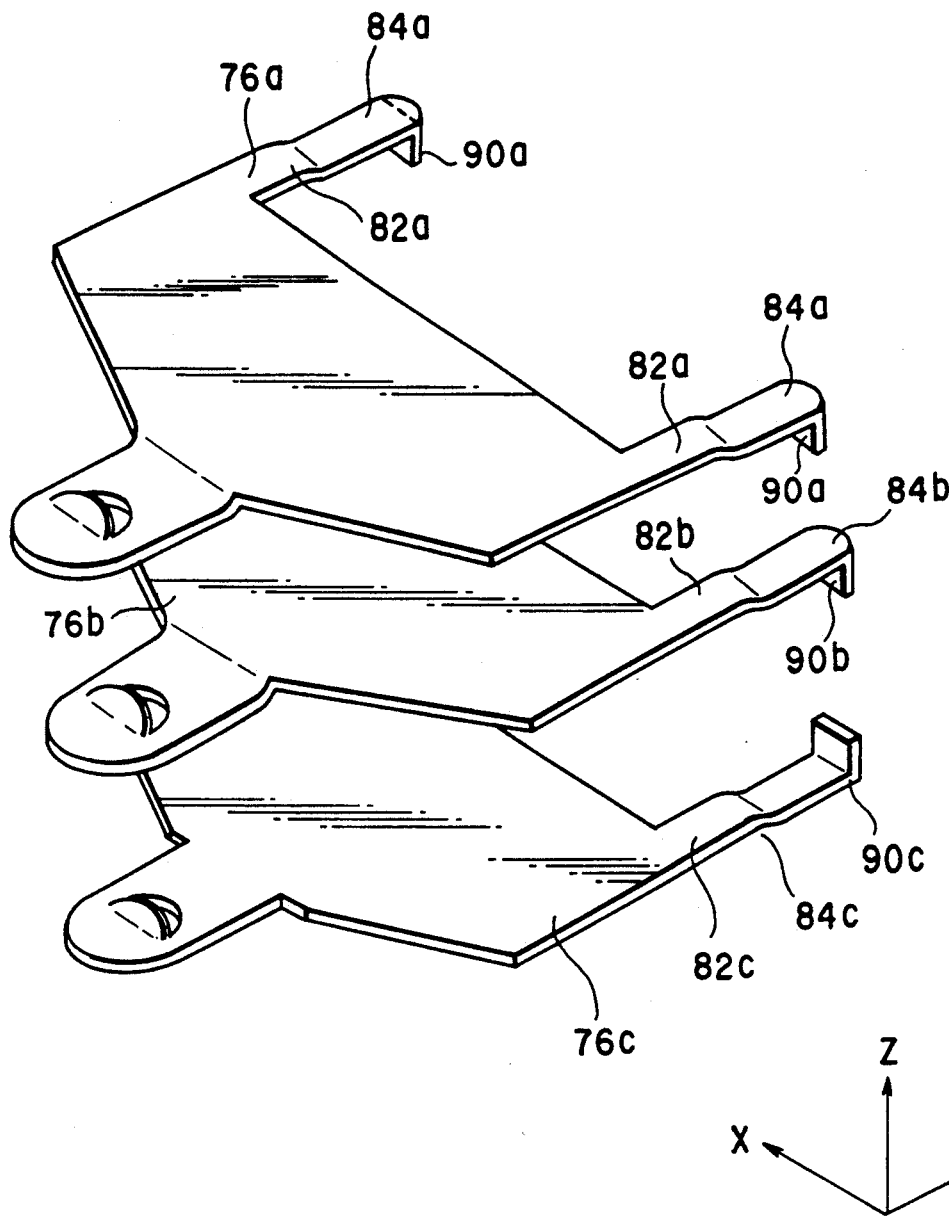
FIG. 23 is a perspective view showing slide plates in the connector device of FIG. 19.

The connector device 2' of the third embodiment preferably has first, second and third ejecting mechanisms 54a, 54b and 54c corresponding to the first, second and third decks 221, 222 and 233. FIG. 23 show slides plates 76a, 76b and 76c in the ejecting mechanisms of the FIG. 20. These three ejecting mechanisms 54a, 54b and 54c are similar to the ejecting mechanism and c are attached to the reference numerals denoting those structural elements of the first, second and third ejecting mechanisms 54a, 54b and 54c, respectively.

The operation of the connector device 2' equipped with the ejecting mechanisms 54a, 54b and 54c will be explained below. Here the connector device 2' is mounted on the computer system and the circuit boards 252 and 254 are properly connected to the computer system.

Upon attaching and detaching the memory card 3 by the connector device 2' to and from the computer system, the ejecting mechanisms 54a, 54b and 54c can be employed which correspond to the decks 221, 222 and 223 into which a corresponding memory card 3 is inserted.

In the case where one memory card 3, for example, is attached to the computer system, the memory card 3 is inserted into, for example, the first deck 221 via the insertion inlet 22 of the housing and the I/O connector 31 of the memory card 3 is matingly connected to the upper side pin contact group 241 of the I/O connector 31 whereby the memory card 3 is connected to the computer system.

At this time, the front end face of the memory card 3 engages with the eject hooks 90a of the slide plate 76a and, with the forward movement of the slide plate 76a, the rotation lever 56a is rotated around the rotation shaft 58a whereby the slide member 62a is projected from the end face of the housing 220 on the insertion inlet 22 side.

Upon the detachment of the memory card 3, the slide member 62a is pushed and the rotation lever 56a is rotated around the rotation shaft 56a. Through the engagement of the slide plate's claw 80a with the rotation lever's claw 74a, the side plate 76a is moved, in the Y direction, along the surface of the housing plate 18. Then the mating connection of the memory card 3 and pin contact group 241 is released by the eject hooks 90a and the memory card 3 is withdrawn from the connector body 240.

When the memory card 3 is inserted into the second deck 222 or the third deck 223 to achieve a mating connection to the pin contact group 242 or 243, the memory card 3 can be attached or detached to and from the connector body in the same way as set out above.

It is possible to independently operate the three ejecting mechanisms 54a, 54b and 54c. In the case where two or three memory cards 3 are held in the connector device 2' at a time, the respective memory cards 3 can independently be attached and detached to and from the computer system. While, for example, data is loaded from the memory card 3 into the computer system, the other two memory cards 3 can be detached from the computer system.

In the case where HDD package 4 is attached and detached to and from the computer system, the intermediate ejecting mechanism 54b alone is employed.

Upon the attachment of HDD package 4 to the computer system, HDD package 4 is inserted into the housing 220 via the insertion inlet 22 and guided in the slot 230 to achieve a mating connection between the HDD I/O connector 45 and the lower pin contact group 244. It is thus possible to connect HDD package to the computer system. In this state, ejecting hooks 90b of the slide plate 76b in the lower ejecting mechanism 54b engages with the end face of HDD package 4 on the I/O connector 45 side. It is thus possible to attach or detach HDD package 4 to and from the computer system as in the case of the memory card 3.

The present invention is not restricted to the aforementioned embodiments. Various changes or modifications of the present invention can be made without departing from the spirit and scope of the present invention.

More memory cards and/or HDD package's may be held in the connector device by making the housing still higher in the Z direction and increasing the number of decks involved. In addition to the combined deck for the memory card and HDD package, it is also possible to provide an HDD package-only deck.

In the absence of the upper and lower ejecting mechanisms, it is particularly not necessary to provide the upper and lower housing plates of the housing. In this case, the upper and lower surfaces of the housing can be defined by the casing of the computer system.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A connector device for selectively connecting at least one of a memory card and a hard disk drive package as a data storage device, comprising:
   a housing having a pair of opposing side walls defining a storage space of said housing, one end of said housing defining an insertion port for inserting said at least one data storage device into the storage space of said housing, a height of the storage space being divided to define at least upper and lower storage decks within the storage space, the upper and lower storage decks being contiguous and uninterrupted therebetween;
   a connector body coupled to the end of said housing opposite the insertion port, said connector body having at least one contact array fixedly disposed in one of the upper and lower storage decks and adapted to connect with a memory card, and said connector body having a structure for presenting at least one of at least two contact arrays in the other storage deck, said at least two contact arrays including one contact array adapted to connect with a memory card and one contact array adapted to connect with a hard disk drive package.

2. A connector device as recited in claim 1 wherein said structure comprises an end wall within which both of said at least two contact arrays are fixedly disposed and simultaneously presented in said other storage space.

3. A connector device as recited in claim 2 wherein one of said at least two contact arrays is fixedly disposed above the other of said at least two contact arrays.

4. A connector device as recited in claim 2 further comprising an ejection mechanism for ejecting storage devices from the respective storage decks, said ejection mechanism comprising at least:
   a first slide plate disposed proximate the storage deck having at least one contact array disposed therein, said first slide plate being operable to slide toward and away from said connector section in a first plane parallel to a plane defined by said opposing sidewalls, said first slide plate having engaging hooks that extend into the storage deck having said at least one contact array a distance sufficient to engage with a forward end face of a storage device connected to said at least one contact array; and
   a second slide plate disposed proximate the storage deck having said at least two contact arrays positioned therein, said second slide plate being operable to slide toward and away from said connector section in a second plane parallel to the plane defined by said opposing sidewalls, said second slide plate having engaging hooks that extend into the storage deck having at least two contact arrays a distance sufficient to engage with a forward end face of a storage device connected to either one of said at least two contact arrays.

5. A connector device as recited in claim 1 wherein said structure comprises a movable member upon which both of said at least two contact arrays are carried, said movable member being operable to alternately move one of said at least two contact arrays into a position within said other storage space.

6. A connector device as recited in claim 5 wherein said movable member comprises a pivot arm having a rotation shaft extending between and perpendicular to the opposing side walls of said housing, said pivot arm being operable to pivot between a first position and a second position, said at least two contact arrays being arranged on the rotation shaft of said pivot arm such that one of said at least two contact arrays is presented in said other storage space when the pivot arm is in the first position, and the other of said at least two contact arrays is presented in said other storage space when the pivot arm is in the second position.

7. A connector device as recited in claim 1 wherein the storage space of said housing has a height substantially equal to a height of said at least one hard disk drive package, and wherein the respective storage decks defined within the storage space of said housing each have a height greater than or equal to a height of said at least one memory card.

8. A connector device as recited in claim 1 wherein a pair of opposing guide slots are formed lengthwise along the inner surfaces of the respective sidewalls of said housing in each of the storage decks thereof, each pair of opposing guide slots forming a channel for receiving a memory card and being positioned in its respective storage deck so as to guide a memory card inserted therein into mating connection with a corresponding contact array.

9. A connector device as recited in claim 8 wherein the unslotted portions of each side wall are spaced at an interval substantially equal to a width of a hard disk drive package and form a channel for receiving said hard disk drive package, and wherein each pair of opposing guide slots has a width substantially equal to a width of a memory card.

10. A connector device as recited in claim 1 wherein a memory card has a width $W_1$ and a hard disk drive package has a width $W_2$, $W_1$ being greater than $W_2$, and wherein a first pair of opposing guide slots are formed lengthwise along the inner surfaces of the respective sidewalls of said housing in one portion of each of the storage decks thereof and a second pair of opposing guide slots are formed lengthwise along the inner surface of the respective sidewalls of said housing in a remaining portion of each of the storage decks, each first pair of opposing guide slots in each storage deck having a width substantially equal to $W_1$ and forming a channel for receiving a memory card, each second pair of opposing guide slots in the remaining portion of each storage deck having a width substantially equal to $W_2$, the second pairs of guide slots in each storage deck cooperating to define a channel for receiving said hard disk drive package.

11. A connector device as recited in claim 1 further comprising at least one door pivotally mounted to a front edge of said housing proximate the insertion port thereof, said door being positioned to cover a portion of the insertion port corresponding to at least one of said storage decks and being adapted to pivot into the housing when a storage device is inserted into said at least one storage deck.

12. A connector device as recited in claim 1 further comprising a memory card interface circuit electrically coupled to each contact array that is adapted to connect with a memory card.

13. A connector device as recited in claim 1 further comprising a hard disk drive controller electrically coupled to said at least one contact array that is adapted to connect with a hard disk drive package.

14. A connector device as recited in claim 1 further comprising a locking member pivotally mounted on said housing proximate the insertion port, said locking member being operable to at least partially obstruct the insertion port when a hard disk drive package is connected to one of said contact arrays to prevent the hard disk drive from inadvertently being disconnected from said one contact array.

15. A connector device for selectively connecting at least one of a memory card and a hard disk drive package as a data storage device, comprising:

a housing having a pair of opposing side walls defining a storage space of said housing, one end of said housing defining an insertion port for inserting said at least one data storage device into the storage space of said housing, a height of the storage space being divided to define at least upper and lower storage decks within the storage space, the upper and lower storage decks being contiguous and uninterrupted therebetween;

a connector body coupled to the end of said housing opposite the insertion port, said connector body having at least one contact array fixedly disposed in one of the upper and lower storage decks and adapted to connect with a memory card, and at least two contact arrays fixedly disposed in the other storage deck, said at least two contact arrays including at least one contact array adapted to connect with a memory card and at least one contact array adapted to connect with a hard disk drive package.

16. A connector device as recited in claim 15 wherein the storage space of said housing has a height substantially equal to a height of said at least one hard disk drive package, and wherein the respective storage decks defined within the storage space of said housing each have a height greater than or equal to a height of said at least one memory card.

17. A connector device as recited in claim 16 wherein a pair of opposing guide slots are formed lengthwise along the inner surfaces of the respective sidewalls of said housing in each of the storage decks thereof, each pair of opposing guide slots forming a channel for receiving a memory card and being positioned in its respective storage deck so as to guide a memory card inserted therein into mating connection with the contact array adapted to connect with said memory card.

18. A connector device as recited in claim 17 wherein the unslotted portions of each side wall are spaced at an interval substantially equal to a width of a hard disk drive package and form a channel for receiving said hard disk drive package, and wherein each pair of opposing guide slots has a width substantially equal to a width of said memory card.

19. A connector device as recited in claim 15 wherein a memory card has a width $W_1$ and hard disk drive package has a width $W_2$, $W_1$ being greater than $W_2$, and wherein a first pair of opposing guide slots are formed lengthwise along the inner surfaces of the respective sidewalls of said housing in an upper portion of each of the storage decks thereof and a second pair of opposing guide slots are formed lengthwise along the inner surface of the respective sidewalls of said housing in a remaining portion of each of the storage decks, each first pair of opposing guide slots in the upper portion of each storage deck having a width substantially equal to $W_1$ and forming a channel for receiving a memory card, each second pair of opposing guide slots in the remaining portion of each storage deck having a width substantially equal to $W_2$, the second pairs of guide slots in each storage deck cooperating to define a channel for receiving said hard disk drive package.

20. A connector device as recited in claim 19 wherein, in each storage deck, said at least one contact array that is adapted to connect with a memory card is disposed in the upper portion of that storage deck, whereby the first pair of opposing guide slots in each storage deck operate to guide a memory card inserted therein into electrical connection with said at least one contact array.

21. A connector device as recited in claim 15 further comprising at least one door pivotally mounted to a front edge of said housing proximate the insertion port thereof, said door being positioned to cover a portion of the insertion port corresponding to at least one of said storage decks and being adapted to pivot into the housing when a storage device is inserted into said at least one storage deck.

22. A connector device as recited in claim 15 further comprising a memory card interface circuit electrically coupled to said at least one contact array in each of the storage decks that is adapted to connect with a memory card.

23. A connector device as recited in claim 15 further comprising a hard disk drive controller electrically coupled to said at least one contact array that is adapted to connect with a hard disk drive package.

24. A connector device as recited in claim 15 further comprising a locking member pivotally mounted on said housing proximate the insertion port, said locking member being operable to at least partially obstruct the insertion port when a hard disk drive package is connected to one of said contact arrays to prevent the hard disk from inadvertently being disconnected from said one contact array.

25. A connector device as recited in claim 15 further comprising an ejection mechanism for ejecting storage devices from the respective storage decks, said ejection mechanism comprising at least:

a first slide plate disposed proximate the storage deck having at least one contact array disposed therein, said first slide plate being operable to slide toward and away from said connector section in a first plane parallel to a plane defined by said opposing sidewalls, said first slide plate having engaging hooks that extend into the storage deck having at least one contact array a distance sufficient to engage with a forward end face of a storage device connected to said at least one contact array; and a second slide plate disposed proximate the storage deck having at least two contact arrays disposed therein, said second slide plate being operable to slide toward and away from said connector section in a second plane parallel to the plane defined by said opposing sidewalls, said second slide plate having engaging hooks that extend into the storage deck having at least two contact arrays a distance sufficient to engage with a forward end face of a storage device connected to either one of said at least two contact arrays.

* * * * *